United States Patent
Phillips et al.

(10) Patent No.: US 12,055,193 B2
(45) Date of Patent: Aug. 6, 2024

(54) VIBRATION ISOLATION SYSTEMS WITH REACTION MASSES AND ACTUATORS

(71) Applicant: Nikon Corporation, Tokyo (JP)

(72) Inventors: Alton Hugh Phillips, Oro Valley, AZ (US); Michael Birk Binnard, Belmont, CA (US); Yoon Jung Jeong, San Mateo, CA (US); Matthew Parker-McCormick Bjork, Davis, CA (US)

(73) Assignee: Nikon Corporation, Tokyo (JP)

( * ) Notice: Subject to any disclaimer, the term of this patent is extended or adjusted under 35 U.S.C. 154(b) by 383 days.

(21) Appl. No.: 17/497,637

(22) Filed: Oct. 8, 2021

(65) Prior Publication Data

US 2022/0112934 A1 Apr. 14, 2022

Related U.S. Application Data

(60) Provisional application No. 63/089,833, filed on Oct. 9, 2020.

(51) Int. Cl.
| | |
|---|---|
| *F16F 15/00* | (2006.01) |
| *B25J 19/00* | (2006.01) |
| *F16F 7/10* | (2006.01) |
| *F16F 15/02* | (2006.01) |

(52) U.S. Cl.
CPC ......... *F16F 15/002* (2013.01); *B25J 19/0091* (2013.01); *F16F 7/1005* (2013.01); *F16F 15/02* (2013.01); *F16F 2230/18* (2013.01); *G05B 2219/39199* (2013.01)

(58) Field of Classification Search
CPC .................................................. F16F 15/002
See application file for complete search history.

(56) References Cited

U.S. PATENT DOCUMENTS

| | | | | |
|---|---|---|---|---|
| 5,291,975 | A * | 3/1994 | Johnson | F16C 39/06 267/136 |
| 5,816,122 | A * | 10/1998 | Benning | F16F 15/02 408/11 |
| 6,523,695 | B1 | 2/2003 | Ueta et al. | |
| 6,590,639 | B1 | 7/2003 | Yuan et al. | |
| 6,758,313 | B2 | 7/2004 | Binnard | |
| 2009/0040638 | A1* | 2/2009 | van Deuren | G03F 7/70825 359/877 |
| 2012/0241268 | A1* | 9/2012 | Laro | G02B 27/646 188/379 |
| 2016/0207194 | A1* | 7/2016 | Blood | B25J 9/1615 |
| 2019/0120320 | A1* | 4/2019 | Donaldson | F16F 15/073 |
| 2021/0299864 | A1* | 9/2021 | Lu | B25J 9/12 |
| 2023/0317505 | A1* | 10/2023 | Kuo | H01L 21/67706 414/806 |

FOREIGN PATENT DOCUMENTS

WO WO-2007054860 A2 * 5/2007 ............. F16F 15/02

* cited by examiner

*Primary Examiner* — Suresh Suryawanshi
(74) *Attorney, Agent, or Firm* — Klarquist Sparkman, LLP

(57) ABSTRACT

Apparatus include a reaction mass and an actuator coupled to the reaction mass. The actuator is configured to couple to a payload and to move the reaction mass in response to a movement error of the payload to reduce the movement error of the payload. Robotic systems using actuated reaction masses, as well as related methods of reducing movement errors, are also disclosed.

21 Claims, 17 Drawing Sheets

VIBRATION ISOLATION SYSTEMS WITH REACTION MASSES AND ACTUATORS

CROSS REFERENCE TO RELATED APPLICATION

This application claims the benefit of U.S. Provisional Patent Application No. 63/089,833, filed on Oct. 9, 2020, which is incorporated herein by reference in its entirety.

FIELD

The field is vibration isolation and dynamic systems.

BACKGROUND

Robotic systems can experience problems during operation when disturbances and vibrations occur, leading to imprecision and poor processing results in various applications such as laser processing and tool manipulation. Accordingly, there is a need for improved vibration isolation systems.

SUMMARY

Vibration isolation system (VIS) modules, apparatus, and methods are disclosed that use actuatable reaction masses to reduce or eliminate vibrational movement errors of payloads in systems such as robotic systems.

According to an aspect of the disclosed technology, apparatus include a reaction mass and an actuator that is coupled to the reaction mass. The actuator is configured to couple to a payload and to move the reaction mass in response to a movement error of the payload to reduce the movement error of the payload. In some examples, the actuator is configured to move the reaction mass in a corrective direction of the movement error such that the movement error is reduced. In some examples, the payload is an end effector of a robot. In particular examples, the end effector includes an optical processing unit. In selected examples, the payload comprises a robot arm.

In some examples, the actuator is a linear actuator configured to translate the reaction mass along a linear direction corresponding to the corrective direction of the movement error to produce a reaction force. Some linear actuators examples include a voice coil motor, linear motor, pneumatic piston, hydraulic piston, or pneumatic bellows, or a combination thereof. In some examples, the actuator comprises a rotary actuator configured to rotate the reaction mass about an axis of rotation to produce a rotational reaction torque along the corrective direction of the movement error.

In some examples, a center of mass of the reaction mass does not coincide with the axis of rotation. Particular examples of rotary actuators include brushless servo motors. In some embodiments, the apparatus comprises a rotary actuator coupled to the reaction mass and configured to tilt the axis of rotation to allow a correction of a different corrective direction of movement error.

In some examples, the actuator comprises a support configured to rigidly attach the actuator to the payload. In some cases, the actuator is connected in series between the payload and the reaction mass. In some examples, the movement error results from at least one of: a force to the payload from an external environment, oscillations to the payload from the external environment, and resonances of the payload.

Some examples further include a movement detection system configured to detect the movement error of the payload, and a controller coupled to the actuator and configured to produce an actuator control signal in response to the detected movement error. In these examples, the actuator control signal is configured to cause the actuator to move the reaction mass to reduce the movement error of the payload. In some examples, the movement detection system comprises an inertial measurement unit coupled to the payload. In some examples, the movement detection system is configured to detect a movement error of the payload relative to a surface and the actuator control signal is configured to cause the actuator to move the reaction mass to reduce the movement error between the payload and the surface. The surface can be a moving reference surface, a non-moving reference surface, or a target surface. Some movement detection systems include an optical detection system or displacement measurement unit such as a laser interferometer coupled to the payload or to a reference surface and configured to detect the movement error between the payload and the reference surface. In some cases, the optical detection system or displacement measurement unit can include a laser interferometer, time-of-flight system, laser triangulation system, photogrammetric system or a combination thereof. Some movement detection systems can further include a frequency filter configured to filter a frequency content of the detected movement error. In these systems, the actuator control signal can be configured to cause the actuator to move the reaction mass to reduce the movement error in a selected range of movement frequencies. Some frequency filters can be configured to filter out low frequency content. The movement detection systems as described herein can include one or more movement detectors coupled to various components as needed to detect movement.

Some examples further include a vibration isolation system (VIS) coupled to the robotic component separately from the reaction mass and actuator. In some examples, the VIS is configured to reduce movement error of the payload in a first range of movement frequencies and the actuator is configured to move the reaction mass to reduce movement error of the payload in a second range of movement frequencies different than the first range of frequencies. In some examples, the payload comprises a robot arm and the VIS is coupled between the robot arm and an end effector and configured to reduce a vibration of the end effector.

In some examples, disclosed apparatus include a linear actuator configured to translate the reaction mass along a linear direction of a translation axis to produce a reaction force. The apparatus further includes a second reaction mass and a second linear actuator coupled to the second reaction mass. The second linear actuator is configured to: couple to the payload; translate the second reaction mass along a second translation axis in response to a movement error of the payload about a rotational axis of the payload; and vary a translation of the second reaction mass along the second translational axis in relation to the translation of the reaction mass to produce a rotational reaction torque that reduces the movement error of the payload about the rotational axis. In some examples, the second translation axis is parallel to the translation axis of the actuator and the rotational axis is perpendicular to the translation axes and a line intersecting the translation axes. In some examples, an actuator is a rotary actuator configured to rotate the reaction mass about an axis of rotation to produce a rotational reaction torque and centripetal force. In some examples, a second rotary actuator is coupled to the second reaction mass and is configured to be coupled to the payload and rotate the second reaction mass along a second axis of rotation in response to a movement error of the payload about a rotational axis of the payload. The rotation of the second reaction mass along the second axis of rotation can be varied in relation to the rotation of the reaction mass to produce a rotational reaction torque that reduces the movement error of the payload about the rotational axis. A center of mass of the reaction mass does not coincide with the axis of rotation and a center of mass of the second reaction mass does not coincide with the second axis of rotation. The reaction mass and actuator can comprise a vibration isolation system module configured to couple to the payload.

In some examples, a system for reducing a movement error of a payload includes a plurality of apparatus as disclosed herein, each apparatus comprising a reaction mass and an actuator coupled to the reaction mass, the actuator being configured to couple to a payload and to move the reaction mass in response to a movement error of the payload to reduce the movement error of the payload, the plurality of apparatus being collectively configured to reduce the movement error of the payload. In some cases, the plurality of apparatus act collectively or in unison to reduce the movement error of the payload. In some examples, the plurality includes one or more of a linear actuator and a rotary actuator.

According to another aspect of the disclosed technology, methods include providing an actuator coupled to a reaction mass; using the actuator to couple to a payload; and in response to a movement error of the payload, moving the reaction mass with the actuator coupled to the payload to reduce the movement error of the payload. In some cases, the reaction mass is moved in a corrective direction of the movement error such that the movement error is reduced. In some examples, the actuator comprises a linear actuator and moving the reaction mass with the actuator comprises translating the reaction mass along a linear direction corresponding to a corrective direction of the movement error to produce a reaction force. In some instances, the actuator comprises a rotary actuator and moving the reaction mass with the actuator comprises rotating the reaction mass about an axis of rotation to produce a rotational reaction torque along a corrective direction of the movement error. In such instances, moving the reaction mass with the actuator can comprise tilting the axis of rotation to allow a correction of a different corrective direction of movement error.

Disclosed methods further comprise detecting the movement error of the payload; and producing an actuator control signal in response to the detected movement error that causes the actuator to move the reaction mass to reduce the movement error. In some embodiments, the movement error is detected by a movement detection system. The movement detection system can comprise an inertial measurement unit coupled to the payload.

In some cases, methods further comprise detecting the movement error between the payload and a surface and producing an actuator control signal in response to the detected movement error. The actuator control signal causes the actuator to move the reaction mass to reduce the movement error between the payload and the surface. The surface can include a moving reference surface, a non-moving reference surface, and a target surface. A movement detection system configured to detect the movement error of the payload can include an optical detection system or displacement measurement unit such as a laser interferometer coupled to the payload or to a reference surface and configured to detect the movement error between the payload and the reference surface. The optical detection system or displacement measurement unit can include at least one of: a laser interferometer, time-of-flight system, laser triangulation system, photogrammetric system or a combination thereof.

Methods in some examples include filtering a frequency content of the detected movement error and producing an actuator control signal in response to the filtered frequency content that causes the actuator to move the reaction mass to reduce the movement error in a selected range of movement frequencies.

In some embodiments, methods include coupling a vibration isolation system (VIS) to the payload separately from the reaction mass and actuator; reducing a component of the movement error of the payload in a first range of movement frequencies using the VIS; and reducing a component of the movement error of the payload in a second range of movement frequencies different than the first range of frequencies by moving the reaction mass with the actuator. In some cases, the payload comprises a robot arm, the VIS is coupled between the robot arm and an end effector, and the method includes reducing a vibration of the end effector using the VIS.

In some embodiments, the actuator comprises a plurality of actuators, and the reaction mass comprises a plurality of reaction masses. Each one of the plurality of actuators is coupled to a respective one of the plurality of reaction masses. Disclosed methods further comprise using each actuator in the plurality of actuators to couple to the payload and reducing a movement error of the payload by moving one or more of the reaction masses using the actuator coupled to the reaction mass being moved to move the payload in response to the movement error of the payload. In some cases, the plurality of actuators and the plurality of reaction masses are collectively configured to reduce the movement error of the payload. In certain embodiments, the plurality of actuators includes three linear actuators and three rotary actuators. Each linear actuator is configured to translate the reaction mass to which it is coupled along a linear direction of a translation axis to produce a reaction force and each rotary actuator is configured to rotate the reaction mass to which it is coupled about an axis of rotation to produce a rotational reaction torque.

According to a further aspect of the disclosed technology, robotic systems include a base, a robot arm coupled to the base, a payload coupled to the robot arm, and a vibration isolation system comprising a reaction mass and an actuator coupled to the reaction mass, the actuator being configured to move the reaction mass in response to a movement error of at least one of the robot arm and the payload, the reaction mass being moved in a corrective direction of the movement error to reduce the movement error. In some cases, the vibration isolation system comprises a plurality of VIS modules, each VIS module comprising a reaction mass and an actuator coupled to the reaction mass respectively, the actuator of each VIS module being configured to move the reaction mass to which it is coupled in response to a movement error of at least one of the robot arm and the payload. In some examples, the payload includes an end effector and in some instances, the end effector comprises an optical processing unit.

In some embodiments, an apparatus comprises a reaction mass and an actuator configured to generate a force, the reaction mass being moved at least in part by the force generated by the actuator to reduce a positioning error of a payload. According to further aspects of the disclosed technology, a robotic system comprises a base, a robot arm coupled to the base, and an apparatus comprising a reaction mass and an actuator configured to generate a force, the reaction mass being moved at least in part by the force generated by the actuator to reduce a positioning error of a payload, and wherein the robot arm is coupled to the payload. In some examples, a reaction force from the actuator is applied to the payload.

In some cases, the actuator is coupled to the reaction mass, and in some instances, the actuator is coupled to the payload. Coupling can be achieved in various ways, including in a contact manner and a non-contact manner. For example, rotary and linear (Lorentz type) actuators comprise a coil, a magnet and a guide. Force is generated between the coil and magnet as electrons flowing through the coil travel through the magnet's magnetic field and is described by the Lorentz force law. The guide prevents the coil and the magnet from contacting. The guide is typically a contact type, such as a linear or rotary ball/roller bearing or a linear or rotary flexural bearing. Non-contacting guides include linear or rotary fluid (e.g. air) bearings or electromagnetic bearings.

In another representative embodiment, an apparatus comprises a reaction mass and an actuator that is coupled to the reaction mass, wherein the actuator is configured to couple to a payload and to move the reaction mass in response to a movement error of the payload to reduce the movement error of the payload.

In some embodiments, the actuator is configured to move the reaction mass in a corrective direction of the movement error such that the movement error is reduced.

In some embodiments, the payload comprises one or more of: an end effector, an optical processing unit, and a robot arm.

In some embodiments, the actuator is a linear actuator configured to translate the reaction mass along a linear direction corresponding to the corrective direction of the movement error to produce a reaction force, and the linear actuator comprises a voice coil motor, linear motor, pneumatic piston, hydraulic piston, or pneumatic bellows, or a combination thereof.

In some embodiments, the actuator comprises a rotary actuator configured to rotate the reaction mass about an axis of rotation to produce at least one of a rotational reaction torque along the corrective direction of the movement error and a centripetal force.

In some embodiments, the apparatus further comprises a rotary actuator coupled to the reaction mass and configured to tilt the axis of rotation to allow a correction of a different corrective direction of movement error.

In some embodiments, the apparatus further comprises a movement detection system configured to detect the movement error of the payload, and a controller coupled to the actuator and configured to produce an actuator control signal in response to the detected movement error. The movement detection system comprises at least one of an inertial measurement unit and a displacement measurement unit coupled to the payload, and the actuator control signal is configured to cause the actuator to move the reaction mass to reduce the movement error of the payload.

In some embodiments, the movement detection system comprises a displacement measurement unit coupled to the payload or to a reference surface and configured to detect the movement error between the payload and the reference surface, and the displacement measurement unit comprises at least one of: a laser interferometer, time-of-flight system, laser triangulation system, photogrammetric system or a combination thereof.

In some embodiments, the movement detection system is configured to detect a movement error of the payload relative to a surface and wherein the actuator control signal is configured to cause the actuator to move the reaction mass to reduce the movement error between the payload and the surface.

In some embodiments, the movement detection system further comprises a frequency filter configured to filter low frequency content of the detected movement error and wherein the actuator control signal is configured to cause the actuator to move the reaction mass to reduce the movement error in a selected range of movement frequencies.

In some embodiments, the apparatus further comprises a vibration isolation system (VIS) coupled to the payload separately from the reaction mass and actuator, and the VIS is configured to reduce movement error of the payload in a first range of movement frequencies and the actuator is configured to move the reaction mass to reduce movement error of the payload in a second range of movement frequencies different than the first range of movement frequencies.

In some embodiments, the payload comprises a robot arm, the VIS is coupled between the robot arm and an end effector, and the VIS is configured to reduce a vibration of the end effector.

In some embodiments, the actuator is a linear actuator configured to translate the reaction mass along a linear direction of a translation axis to produce a reaction force, and the apparatus further comprises a second reaction mass and a second linear actuator coupled to the second reaction mass. The second linear actuator is configured to couple to the payload, translate the second reaction mass along a second translation axis in response to a movement error of the payload about a rotational axis of the payload, and vary a translation of the second reaction mass along the second translational axis in relation to the translation of the reaction mass to produce a rotational reaction torque that reduces the movement error of the payload about the rotational axis.

In certain embodiments, the apparatus further comprises a second reaction mass and a second rotary actuator coupled to the second reaction mass. The second rotary actuator is configured to couple to the payload, rotate the second reaction mass along a second axis of rotation in response to a movement error of the payload about a rotational axis of the payload, and vary a rotation of the second reaction mass along the second axis of rotation in relation to the rotation of the reaction mass to produce a rotational reaction torque that reduces the movement error of the payload about the rotational axis, wherein a center of mass of the reaction mass does not coincide with the axis of rotation and a center of mass of the second reaction mass does not coincide with the second axis of rotation.

In another representative embodiment, a method comprises providing an actuator coupled to a reaction mass, using the actuator to couple to a payload, and in response to a movement error of the payload, moving the reaction mass with the actuator coupled to the payload to reduce the movement error of the payload.

In some embodiments, the actuator comprises a linear actuator and moving the reaction mass with the actuator comprises translating the reaction mass along a linear direction corresponding to a corrective direction of the movement error to produce a reaction force.

In some embodiments, the actuator comprises a rotary actuator and moving the reaction mass with the actuator comprises rotating the reaction mass about an axis of rotation to produce a rotational reaction torque along a corrective direction of the movement error.

In some embodiments, the method further comprises detecting the movement error between the payload and a surface, and producing an actuator control signal in response to the detected movement error that causes the actuator to move the reaction mass to reduce the movement error between the payload and the surface.

In some embodiments, the method further comprises filtering a frequency content associated with the movement error, and producing an actuator control signal in response to the filtered frequency content that causes the actuator to move the reaction mass to reduce the movement error in a selected range of movement frequencies.

In some embodiments, moving the reaction mass further comprises moving the reaction mass with the actuator to correct a steady-state position error of the payload.

In another representative embodiment, a robotic system comprises a base, a robot arm coupled to the base, and an apparatus comprising a reaction mass and an actuator configured to generate a force. The reaction mass is moved at least in part by the force generated by the actuator to reduce a positioning error of a payload, and the robot arm is coupled to the payload.

The foregoing and other objects, features, and advantages of the disclosed technology will become more apparent from the following detailed description, which proceeds with reference to the accompanying figures.

DETAILED DESCRIPTION

Introduction and Terminology

Figure 1:
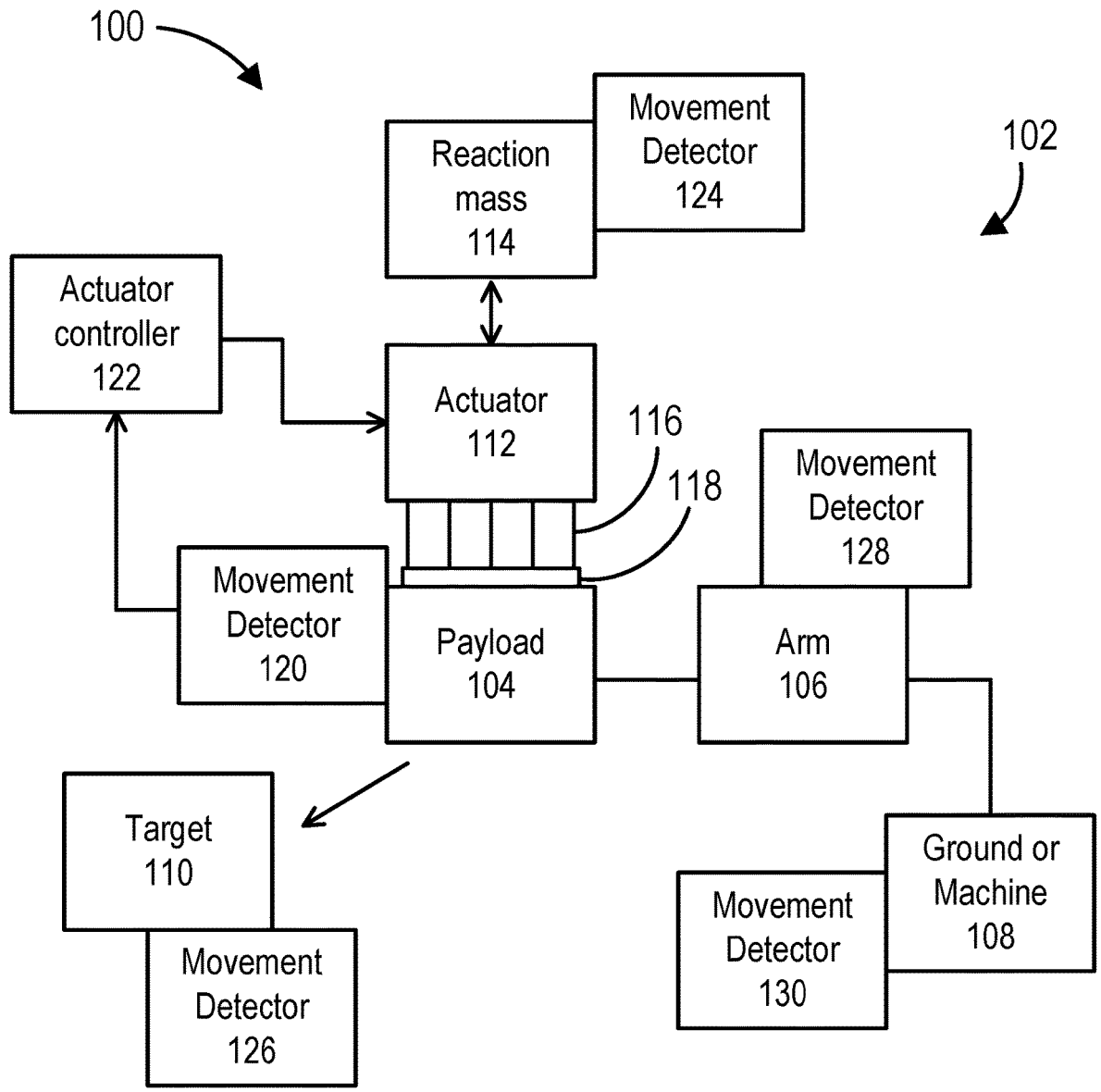
FIG. 1 is a schematic of a robotic system using a vibration isolation system (VIS) with a reaction mass to control movement of a payload.

The disclosed examples generally pertain to systems, apparatus, and methods that can provide stable and accurate positioning at ends of robot arms or on other mobile structures such as drones or other vehicles, including car, trucks, carts, bicycles and others. In some examples, vibration isolation systems (VIS) can be provided between the end of a robot arm (or another mobile support platform) and a payload to reduce the effect of position errors and vibrations of the robot. To effectively accomplish isolation, VIS can support the payload with a controlled force that cancels gravity and preferably with zero stiffness between the payload and the robot. VIS can also provide accelerating (and decelerating) forces to the payload when moving the end effector to a new location.

In practice, VIS systems cannot have perfectly zero stiffness as there is always some amount of parasitic coupling between the robot and the payload. Also, there are typically disturbances acting on the payload such as acoustic noise and wind. Moreover, VIS systems that apply control forces to a payload can excite resonances or disturb the position of a supporting robot with the corresponding reaction forces. In some examples herein, at least a portion of the VIS reaction forces or other forces can be directed to linearly or rotationally actuated reaction masses to reduce a movement error of the payload.

Disclosed examples can improve performance with an active control system that applies reaction forces and rotational reaction torques to the payload, the robot arm, or other components, to counteract these various disturbances. Control forces can be applied without creating additional disturbance and vibration of the robot. VIS systems that transmit reaction forces from the VIS actuators directly to the robot can pose problems. In particular, these reactions can have frequency content that excites mechanical resonance of the robot and lead to unstable feedback between robot vibration and VIS reaction.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' may be referred to as "lowest," "best," "minimum," or the like. It will be appreciated that such descriptions are intended to indicate that a selection among many used functional alternatives can be made, and such selections need not be better, smaller, or otherwise preferable to other selections.

Representative Examples of Vibration Isolation Systems and Methods

FIG. 1 shows an example vibration isolation system (VIS) 100 that can be used in a robotic system 102 to reduce movement error of a payload 104 of the robotic system 102 caused by various applied forces and resonances. As shown in FIG. 1, VIS 100 includes a reaction mass 114 and an actuator 112 that is coupled to the reaction mass 114. The actuator 112 is configured to couple to a payload 104 and to move the reaction mass 114 in response to a movement error of the payload to reduce the movement error of the payload.

The reduction in movement error effectively isolates the payload 104 from the various applied forces and resonances. Examples of the various applied forces and resonances can include internal changes introduced by the payload 104, air movement or other effects applied to the payload 104 from an external environment, and resonances, oscillations, or other forces introduced to the payload 104. These forces can be introduced through a coupled system such as an arm 106 or other mobile support platform used to control a positioning or other manipulation of the payload 104 or a separate VIS system coupled to the payload 104 such as between the payload 104 and the arm 106. Examples of the payload 104 include an end effector, a gripper, a robot arm, a machine tool, a laser-based process head, or other process head, or other robotic component. In cases, an end effector may comprise other devices, for example an optical processing unit. In robotic system examples, the arm 106 may be coupled to the ground or a machine 108 such as a robotic base.

In some embodiments, robotic systems can include different types or configurations of robots or robotic components. In particular, robots as used in the disclosed systems are not limited to anthropomorphic robots such as vertically articulated robots but can include SCARA robots (selective compliance assembly robot arm robot). Robots as used in the disclosed systems may also be serial link robots such as rectangular robots, cylindrical robots or a polar robots, parallel link robots or other types of robots.

Representative examples provide isolation to the payload 104 so that it may be held in a fixed position relative to the ground or relative to another target such as a processing target 110 or another reference object. The payload 104 can be an object such as an end effector, a gripper, tool, laser head, ruling engine, or other robotic component or other object etc. For example, the payload 104 can include at least a part of an optical system or an optical element (e.g., a light source), for example, for outputting a laser beam. In certain embodiments, the laser light source can be located around the robotic base, ground or at other locations, and can be linked to the end effector by an optical fiber or other light guide/wave guide. Thus, in some examples, the VIS 100 can be configured to follow or adapt to a movement of the processing target 110. In some examples, the machine 108 is movable on the ground or in the air or water (or other fluid). The isolation provided by the VIS 100 occurs during movement such that the payload 104 does not move or moves within predetermined force or resonance limits or other predefined dynamical constraints. Air based systems where the VIS 100 may be used can include drones, UAVs, aircraft, spacecraft, etc.

The VIS 100 includes an actuator 112 configured to move the reaction mass 114 in a corrective direction of the movement error such that the movement error is reduced. The actuator can be a linear actuator or a rotary actuator, or a combination thereof. A linear actuator can be configured to translate the reaction mass along a linear direction corresponding to the corrective direction of the movement error to produce a reaction force. A rotary actuator can be configured to rotate the reaction mass about an axis of rotation to produce a rotational reaction torque along the corrective direction of the movement error. In some rotary actuator examples, the rotary actuator rotates the reaction mass about an axis of rotation that does not coincide with the center of mass of the reaction mass. In some cases, a rotary actuator is coupled to the reaction mass to enable a tilt of the axis of rotation to allow a correction of a different corrective direction of movement error.

In some embodiments, the actuator 112 is coupled to the reaction mass 114 to form the base components of a VIS module. In some cases, the actuator 112 comprises a support configured to rigidly attach the actuator 112 to the payload 104. In linear actuator examples, the reaction mass 114 is a solid object such as a weight that can be translated along an axis by the actuator 112. Examples of linear actuators can include voice coil motors (VCMs), linear motors, pneumatic pistons, hydraulic pistons, pneumatic bellows, or combinations thereof. In rotary actuator examples, the reaction mass 114 is a solid object such as a weight that can be rotated about an axis by the actuator 112. The actuator 112 can be coupled to a surface of the payload 104, such as through a frame of the actuator 112 or a separate frame or support structure, e.g., frame 116. In some examples, the actuator 112 or frame can be coupled to a translation and/or rotation stage 118 configured to adjust the position of the actuator 112 with its coupled reaction mass 114 relative to the payload 104, e.g., to provide fine adjustment relative to other reaction mass actuator modules or characteristics of the VIS 100 such as a center of mass or gravity. In some examples, the rotary actuator comprises a brushless servo motor.

In representative examples, a movement detection system is configured to detect movement error of the payload. A movement detection system as described herein can include one or more movement detectors coupled to various components (e.g., as described with respect to FIGS. 1-3) as needed to detect movement.

In the example of FIG. 1, a movement detection system (e.g., comprising movement detector 120) is configured to detect movement error of the payload 104. As shown in FIG. 1, the movement detector 120 or a portion of the movement detector 120 can be a part of or coupled to the payload 104, such as by being affixed to a surface or inside the payload 104. In some examples, the movement detector 120 or a portion of the movement detector 120 can also be a separate device that is spaced apart from the payload 104, e.g., at a distance. Examples of the movement detector 120 can include one or more position sensors, inertial measurement units (IMU), accelerometers, etc., which can be part of or coupled to the payload 104. Additional examples can include laser interferometers, laser rangefinders, camera systems, or other metrology systems, which can include the system or portions of the system as part of or coupled to the payload 104 or spaced apart from the payload 104.

In some examples and as will be described more fully below with respect to FIG. 2, a controller (e.g. actuator controller 122) is coupled to the actuator (e.g., actuator 112) and configured to produce an actuator control signal in response to the detected movement error (e.g., movement error detected by movement detector 120). The actuator control signal is configured to cause the actuator to move the reaction mass to reduce the movement error of the payload.

In the example shown, movement detected by the movement detector 120 can be converted to a signal (e.g., an actuator control signal) that is transmitted to an actuator controller 122 that is in communication with the actuator 112. The actuator controller 122 determines an amount of acceleration (e.g., linear or rotational) to be applied to the reaction mass 114 to counteract the detected movement or the portion of the detected movement that constitutes a movement error. The actuator controller 122 controls the actuator 112 to apply the determined amount of acceleration to the reaction mass 114 to reduce the unwanted movement of the payload 104. For example, the actuator controller 122 can calculate a correction force which can be applied to the payload 104 to reduce the movement. The reaction corresponding to that control force is applied to the reaction mass 114. In further examples, detected movement or error values can be correlated with selected force values or control outputs, such as with one or more look-up tables. To reduce the unwanted movement, the actuator 112 produces a reaction force by moving the reaction mass, preferably by moving the reaction mass in a corrective direction of the movement error such that the movement error is reduced. For example, a linear actuation responsive to a vibration can cause the reaction mass to move at the detected vibrational frequency but in a direction that would damp and reduce the vibration. In some examples, the reaction mass movement in response to a vibrational frequency can be 180 degrees out of phase with respect to the vibration. In some examples, the detected movement may be in multiple degrees of freedom, e.g., up to three rotational degrees of freedom and three translational degrees of freedom, and representative VIS module examples apply actuation in a degree of freedom corresponding to the portion of the detected movement in that degree of freedom. Some movement detectors 120 can be configured to detect in a specific degree of freedom that matches the degree of freedom controllable by a corresponding VIS module.

Some systems can include various other movement detectors configured to determine motion of other components that can also be used by the actuator controller 122 to determine control amounts for the actuator 112. For example, the reaction mass 114 can include a movement detector 124 to detect the position or motion of the reaction mass 114. For linear actuation examples, such detection can be used to determine the amount remaining for the movement of the reaction mass 114 before reaching a velocity or stroke limit of the reaction mass 114. In rotary actuator examples, the rotational speed of the reaction mass can be maintained within a specified angular velocity range. As will be discussed further herein below, in some examples actuation of reaction masses can be performed for higher movement frequencies, and lower frequency forces can be applied by the actuator or another VIS or actuation system to prevent the reaction mass from drifting away or exceeding an allowable stroke. Where example VIS are primarily providing high frequency vibrational movement reductions, time averaged forces applied by the reaction mass actuators can be approximately zero. For example, control forces can oscillate between positive and negative directions at a sufficiently high frequency that a time-averaged net force on the reaction mass may be approximately zero thereby mitigating a severity of a drift problem. In general, rotary actuator examples have fewer problems with drift given the larger available range for rotational speed.

In some examples, the movement detection system is configured to detect a movement error of the payload relative to a surface and the actuator control signal is configured to cause the actuator to move the reaction mass to reduce the movement error between the payload and the surface. The surface can be a moving reference surface, a non-moving reference surface, or a target surface. As an example, the movement detection system can include an optical detection system or displacement measurement unit such as a laser interferometer coupled to the payload or to a reference surface and configured to detect the movement error between the payload and the reference surface. The optical detection system or displacement measurement unit can include at least one of: a laser interferometer, time-of-flight system, laser triangulation system, photogrammetric system or a combination thereof.

A movement detector 126 can also be used to determine movement of a target 110. While here the movement detector 126 is shown coupled to the target 110, it can also be positioned in other places, such as on the payload 104. The actuator controller 122 can use detection of the target 110 to adjust the actuator 112 to cause the payload 104 to adjust position as the target 110 moves, e.g., to track the target 110. The arm 106 and/or machine 108 can include movement detectors 128, 130 so that the actuator controller 122 can actuate the reaction mass 114 to reduce a vibration that will be introduced to the payload 104 by the arm 106 and/or machine 108. In some examples, the movement detector 128 and/or 130 can replace the movement detector 120.

Figure 2:
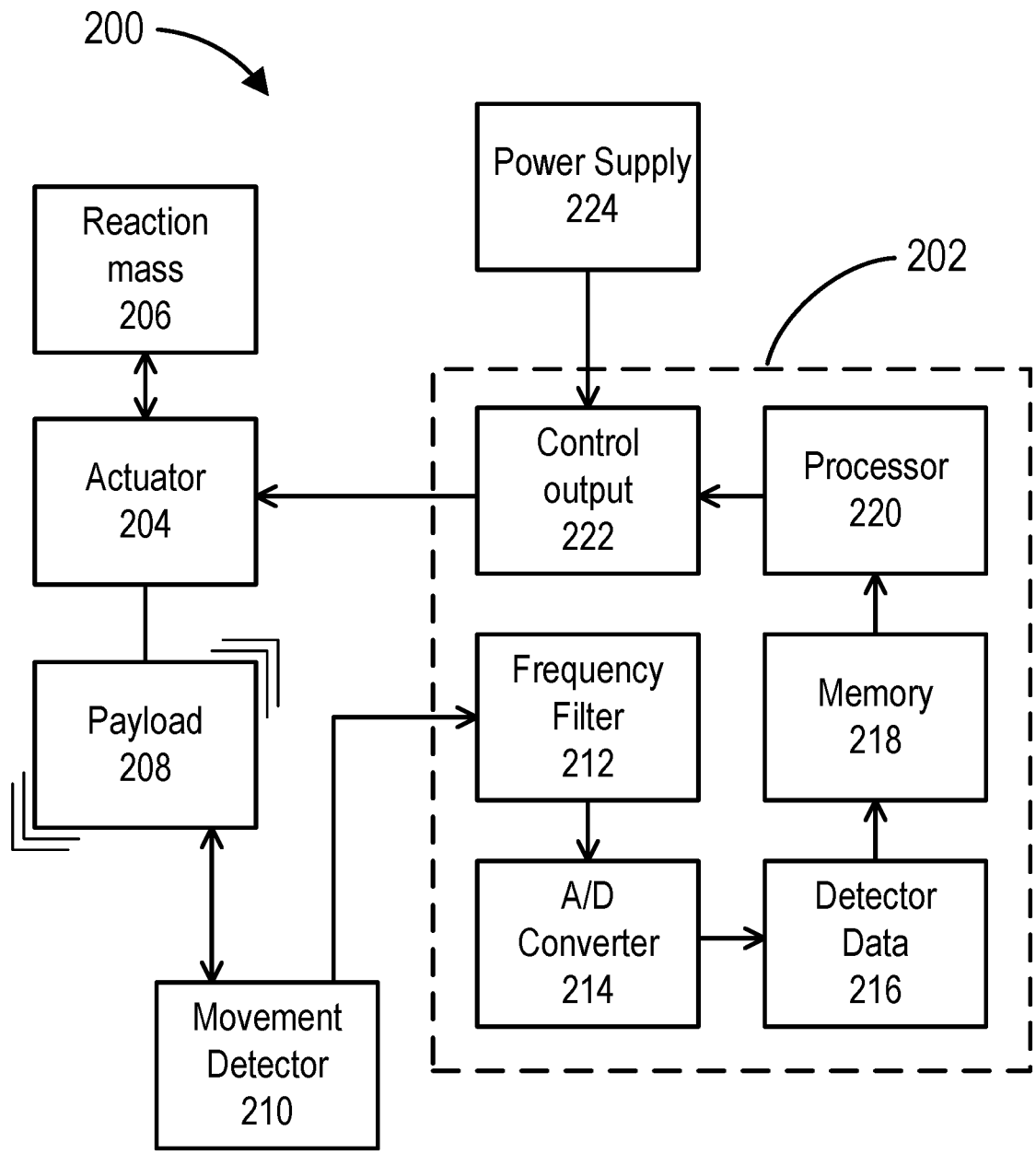
FIG. 2 is a schematic of another VIS system configured to control movement of a payload.

FIG. 2 shows an example VIS 200 including a controller 202 configured to control an actuator 204 that is coupled to a reaction mass 206, with the actuator 204 being coupled to a payload 208 that undergoes an undesirable movement. The payload 208 can be an object such as an end effector, a gripper, tool, laser head, ruling engine, or other robotic component or other object etc. A movement detection system can include a movement detector 210 configured to detect the undesirable movement of the payload 208 and to send a detection signal to the controller 202. For example, the movement detector 210 can detect movement of the payload 208 directly or can detect the movement of a separate object (such as a robot arm or separate VIS system by way of example) coupled to the payload 208.

In some examples, a frequency filter is configured to filter a frequency content of the detected movement error and the actuator control signal is configured to cause the actuator to move the reaction mass to reduce the movement error in a selected range of movement frequencies. The frequency filter can be part of the movement detection system or the controller. In the example shown, the controller 202 includes a frequency filter 212 configured to filter one or more ranges of movement frequencies detected by the movement detector 210. In some cases, the frequency filter is configured to filter out low frequency content. For example, the payload 208 can experience various vibrations and resonances at selected frequencies or ranges of frequencies and the actuated reaction mass 206 can be configured to provide reduced movement of the payload 208 within predetermined frequency ranges. In some examples, the filtered detection signal can be converted to a digital signal with an analog to digital converter 214 to form detector data 216 and the detector data 216 can be stored in memory 218. It will be appreciated that in some examples the movement detector 210 can filter or pre-filter detected movement (including by detecting within a predetermined range or range capability of the detector) and can send a filtered analog or digital signal. In some examples, the movement detector 210 can send an unfiltered digital signal, which can bypass or obviate the need for the A/D converter 214.

In some examples and as shown in FIG. 2, the controller 202 is coupled to the actuator 204 and configured to produce an actuator control signal (e.g., control output 222) in response to the detected movement error (e.g., movement error detected by movement detector 210). Here, the control output 222 is configured to cause the actuator 204 to move the reaction mass 206 to reduce the movement error of the payload 208.

The controller 202 also includes a processor 220 configured to process the detector data 216 and to determine a control output 222 used in connection with a power supply 224 to produce the actuation level by the actuator 204 that reduces movement of the payload 208 in response to the detected movement. Although not required, the disclosed VIS modules and systems that use VIS modules are described in the general context of computer-executable instructions, such as program modules, being executed by the processor 220 or other digital processing system or programmable logic device. Generally, program modules include routines, programs, objects, components, data structures, etc., that perform particular tasks or implement particular abstract data types. Moreover, the disclosed technology may be implemented with other processor and computer system configurations, including hand-held devices, multi-processor systems, microprocessor-based or programmable consumer electronics, network PCs, minicomputers, mainframe computers, dedicated processors, MCUs, PLCs, ASICs, FPGAs, CPLDs, systems on a chip, and the like. The disclosed technology may also be practiced in distributed computing environments where tasks are performed by remote processing devices that are linked through a communications network. In a distributed computing environment, program modules may be located in both local and remote memory storage devices. In some examples, portions of the controller 202 can form part of the actuator 204. In various examples, different components of the controller 202 or other components of the VIS 200 can be in wired and/or wireless communication. The processor 220 and other components of the VIS 200 can include one or more FPGA, PLC, PLD, CPLD, PAL, ASIC, PLL, control logic, relay, detector, amplifier (including lock-in amplifiers), digitizer, etc. The memory 218 can be volatile memory (e.g., registers, cache, RAM), non-volatile memory (e.g., ROM, EEPROM, flash memory, etc.), or a combination of volatile and non-volatile memory. The memory 218 is generally accessible by the processor 220 and can store software in the form computer-executable instructions that can be executed by the processor 220 coupled to the memory 218. The memory 218 can also include or be coupled to removable or non-removable storage or any other medium that can be used to store information in a non-transitory way and which can be accessed within the controller 202 or other components of the VIS 200.

A number of program modules (or data) may be stored in the memory 218 including an operating system, one or more application programs, other program modules, and program data. In representative examples, the memory 218 can store instructions, data arrays, look-up tables, etc., implementing one or more control actions described herein. In some examples, the controller 202 produces the control output 222 by comparing a detected movement with an earlier or predetermined position, velocity, change of velocity, etc. For example, where a selected movement frequency is desired to be zero for the payload 208 to eliminate an associated vibration, the processor 220 can determine an amount of actuation that reduces or eliminates the movement frequency. Example control methods typically include various closed loop feedback approaches such as proportional-integral (PI) or proportional-integral-derivative (PID) control that control around a setpoint, such as a zero amount for a vibrational frequency, but open loop control over actuation can also be provided in some examples. Desired values for a movement or movement frequency also may be non-zero in different instances. For example, the control output 222 can cause actuation that vibrates the payload 208 to match a vibration of another object, such as a processing target. The payload 208 may also undergo translation or other motions during which intended movement of the payload 208 occurs while vibration and other movements of the payload 208 are reduced and controlled by the controller 202 through the control output 222.

In some cases, the frequency filters as described herein and with respect to FIG. 3 below, can be employed to filter a frequency content of the detected movement error. In response to the filtered frequency content, the controller 202 (e.g., via processor 220) can produce an actuator control signal (e.g., control output 222) that causes the actuator to move the reaction mass to reduce the movement error in a selected range of movement frequencies.

Figure 3:
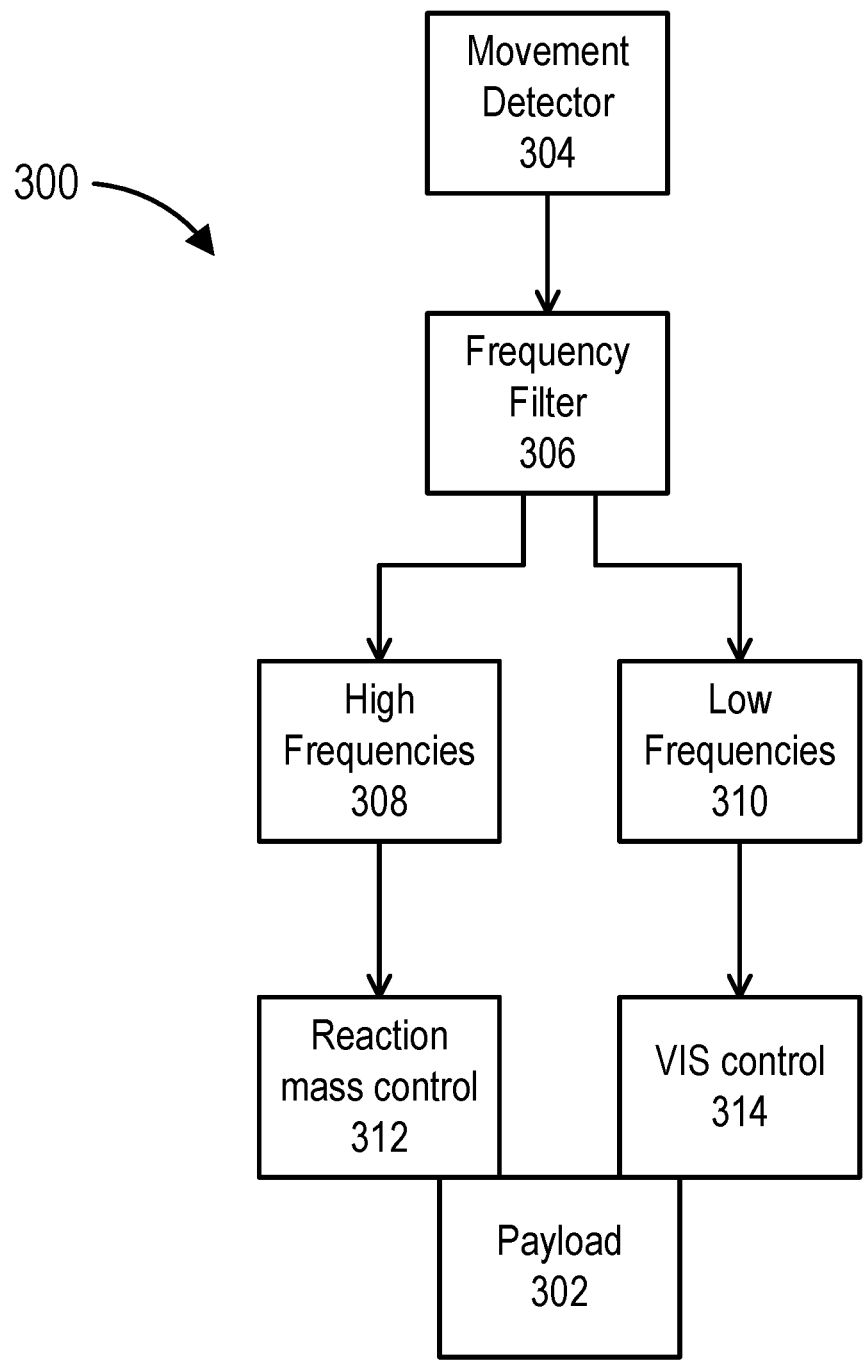
FIG. 3 is a schematic of a frequency filtering system for vibration control.

FIG. 3 shows an example filtering arrangement 300 that can be used to stabilize a payload 302 by reducing its movement, such as a resonant or non-resonant vibration of the payload 302. The payload 302 can be an object such as an end effector, a gripper, tool, laser head, ruling engine, or other robotic component or other object etc. As shown in FIG. 3, a movement detection system can include a movement detector 304 configured to detect movement of the payload 302 across a range of movement frequencies through use of a frequency filter 306. In particular, one or more analog or digital frequency filters 306, such as low pass filters, high pass filters, bandpass filters, notch filters, etc., can be used to partition the frequencies of the detected movement into different signal portions encompassing different frequency ranges. For example, a signal portion 308 can be produced that extends across high frequency range and a signal portion 310 can be produced that extends across a low frequency range. Examples of high frequency ranges can include 10 Hz to 100 Hz, 3 Hz to 30 Hz, 2 Hz to 2 kHz, as well as others. Examples of low frequency ranges can include 0.1 to 10 Hz, 1 to 3 Hz, 0.01 Hz to 2 Hz, etc.

Some examples include a VIS that is coupled to the payload separately from the reaction mass and actuator. In some cases, the VIS is configured to reduce movement error of the payload in a first range of movement frequencies and the actuator is configured to move the reaction mass to reduce movement error of the payload in a second range of movement frequencies different than the first range of frequencies.

In the example of FIG. 3, the high frequency range signal portion 308 is used by a reaction mass controller 312 to control actuation of a reaction mass module coupled to the payload 302 and the low frequency range signal portion 310 is used by a separate VIS controller 314 to control actuation of vibration isolation components that reduce lower frequency vibrations of the payload 302. In some examples, the controllers 312, 314 can be a common controller or operate in a common control environment. In representative examples, the signal portions 308, 310 form adjoining or disjoint frequency ranges to avoid instabilities associated with feedback between controlled actuations.

Robotic systems according to some embodiments include a base, an arm coupled to the base, a payload coupled to the arm, and a vibration isolation system configured to reduce a movement error associated with at least one of the payload or the arm. In some cases, the vibration isolation system comprises a vibration isolation system module (VIS module) that includes a reaction mass and an actuator coupled to the reaction mass. Depending on the application, robotic systems can include a plurality of VIS modules to reduce movement errors of various payloads or other robotic components of the robotic system (e.g., end effectors, robot arms, measurement instruments etc.). The actuator can be configured to move the reaction mass in response to a movement error of at least one of the arm and the payload and in a corrective direction of the movement error to reduce the movement error.

Various examples of robotic systems are depicted and described below with respect to FIGS. 4-11. In particular, examples are shown that include robotic systems having an end effector held by an articulated robotic arm and coupled to a base. The examples also show various configurations of using a vibration isolation system, including one or more VIS modules, to reduce movement error associated with components of the robotic system.

Figure 4:
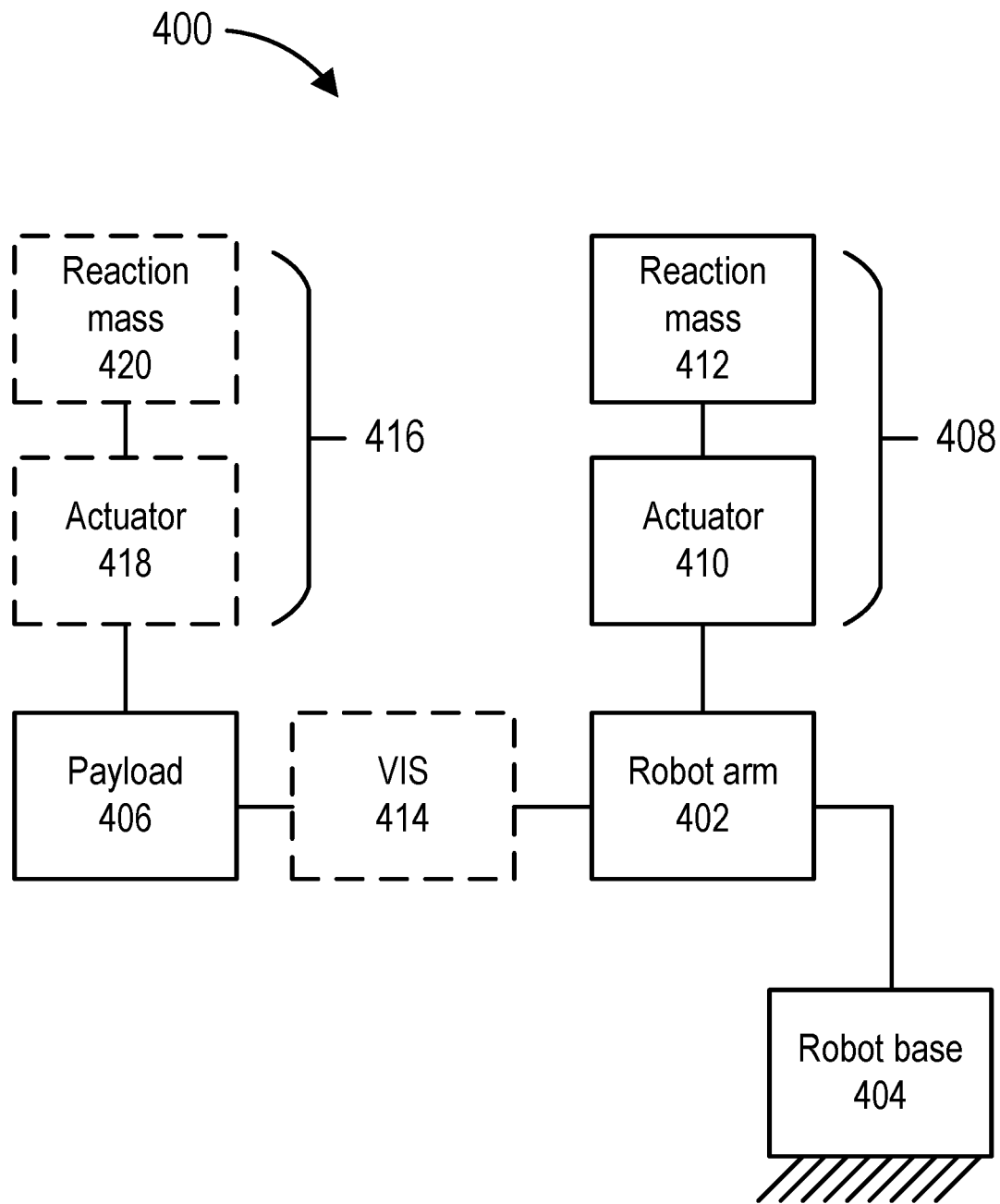
FIG. 4 is a schematic of another robotic system with a VIS system coupled to a robotic arm.

FIG. 4 depicts an exemplary robotic system 400 that includes a base 404 and a robot arm 402 coupled to the base 404, the base being coupled to the ground. In this case, a payload (end effector) is coupled to the arm (e.g., the robot arm 402 holds an end effector 406). The end effector 406 can include a gripper, tool, laser head, ruling engine, or other robotic component or other object etc.

Robotic system 400 can include one or more VIS modules 408, 414, 416, to reduce movement error associated with components of the robotic system, including for example, robot arm 402 and payload 406, which can be an end effector in some cases. In the example shown, VIS module 408 is coupled to robot arm 402 and configured to reduce a movement error of the robot arm 402. VIS module 408 includes a reaction mass 412 and an actuator 410 coupled to a reaction mass 412 and configured to move the reaction mass 412 in response to a movement error of the robot arm 402. A movement error of the robot arm 402 can result from or be caused by vibrations or resonant vibrations introduced from various sources, such as the surrounding environment, the base 404, the end effector 406, or the robot arm 402 itself.

A separate VIS module 414 as shown in FIG. 4 can be coupled between the end effector 406 and the robot arm 402 to reduce a movement error (e.g., vibration) of the end effector 406. In further examples, a separate VIS module 416 that includes a reaction mass 420 and an actuator 418 coupled to the reaction mass 420 can be coupled to the end effector 406 to control movement of the end effector. More specifically, the actuator 418 can be configured to move the reaction mass 420 in response to a movement error of the end effector 406. The reaction mass 420 can be moved in a corrective direction of the movement error of the end effector 406 to control movement of the end effector relative to the robot arm 402 or other components of the robotic system 400 or a reference target.

Figure 5:
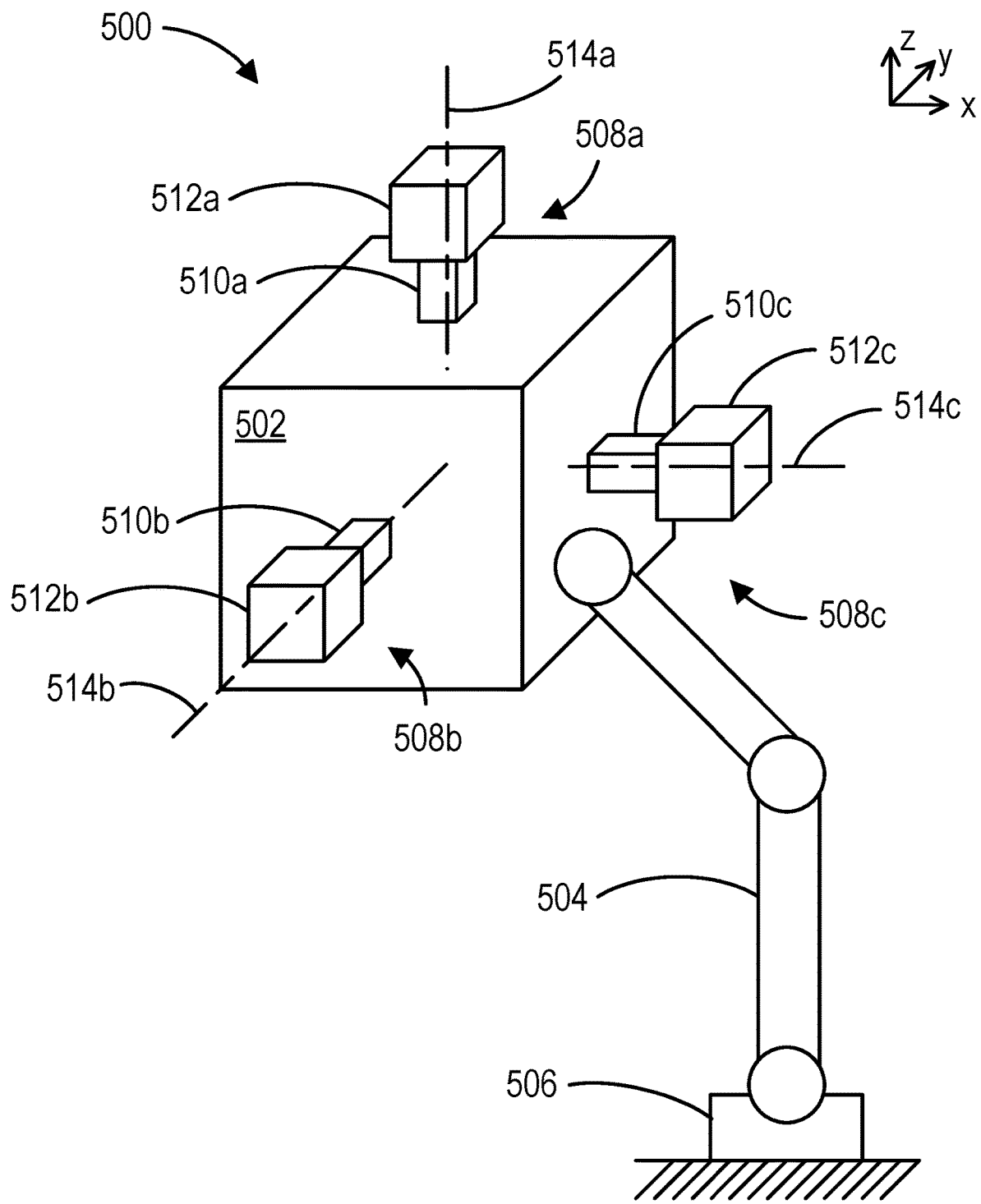
FIGS. 5-7 are perspective schematics of robotic systems configured to provide vibrational control over multiple degrees of freedom.

FIG. 5 shows an exemplary robotic system 500 that includes an end effector 502 being held by an articulated robotic arm 504 coupled to a base 506 attached to the ground. During articulation, the robotic arm 504 moves the end effector 502 to various positions. During the movement to various positions and/or while the end effector 502 is held in a selected position, a plurality of VIS modules 508a, 508b, 508c are coupled to the end effector 502 to reduce vibrational movement of the end effector 502. Similar reference numbers and letters are used herein for convenience and there is no requirement that the VIS modules be identical to each other. The VIS modules 508a-508c include respective linear actuators 510a, 510b, 510c coupled to respective reaction masses 512a, 512b, 512c. During vibrational control of the end effector 502, the linear actuators 510a-510c translate the reaction masses 512a-512c along respective translational axes 514a, 514b, 514c in response to movement in the respective directions corresponding to respective translational degrees of freedom of the end effector 502. In representative examples the axes 514a-514c are mutually perpendicular but do not necessarily intersect each other. In representative embodiments, as positioning error is detected along one of the axes 514a-514c, the associated VIS module 508a-508c having vibrational control over the axis can be responsive to actuate translation of its reaction mass along the axis in the same direction as the detected movement of the end effector 502 along the axis. The reaction force from the actuator 510a-510c will thereby be applied to the end effector 502, reducing or eliminating the position error. In some examples, one or more of the VIS modules can provide small translation and/or rotational adjustments so that the end effector can be moved, e.g., closer or farther from a target surface so as to provide focus adjustments. In some examples, VIS modules are not provided in selected directions, such as along a focus direction where a sufficient depth of field reduces the effect of vibration in the focus direction.

Figure 6:
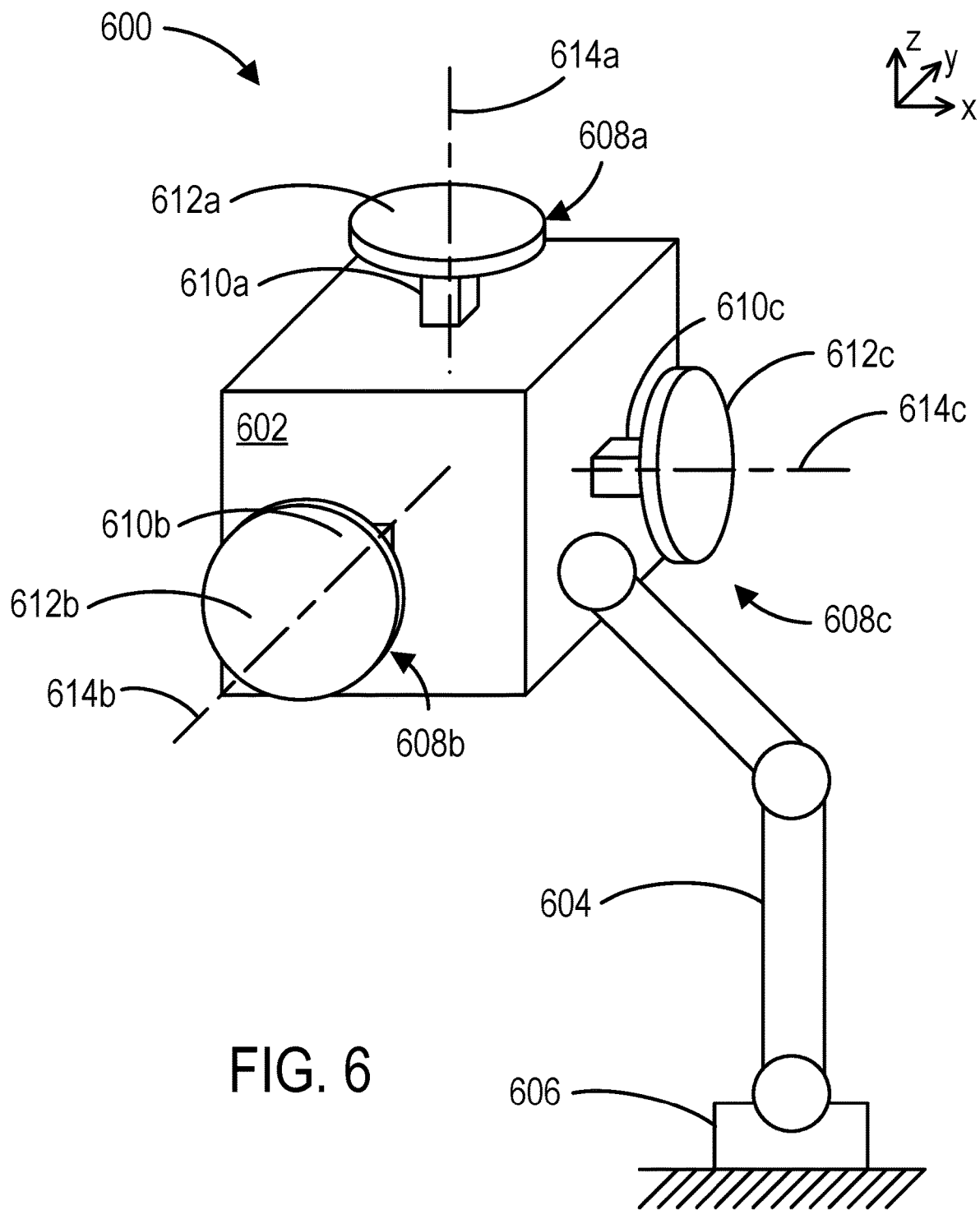

FIG. 6 shows an exemplary robotic system 600 that includes an end effector 602 being held by an articulated robotic arm 604 coupled to a base 606 attached to the ground, which can be similar in some respects to the robotic system 500. During articulation, the robotic arm 604 moves the end effector 602 to various positions. During the movement to various positions and/or while the end effector 602 is held in a selected position, a plurality of VIS modules 608a, 608b, 608c are coupled to the end effector 602 to reduce vibrational movement of the end effector 602. The VIS modules 608a-608c include respective rotary actuators 610a, 610b, 610c coupled to respective reaction masses 612a, 612b, 612c, such as spinning inertial flywheels. Example rotary actuators include brushless servo motors.

During vibrational control of the end effector 602, the rotary actuators 610a-610c rotate the reaction masses 612a-612c in acceleration or deceleration about respective rotational axes 614a, 614b, 614c in response to rotational movement in the respective directions corresponding to respective rotational degrees of freedom of the end effector 602. Rotary actuators 610a-610c apply accelerating, and or, decelerating torques to their respective reaction masses 612a-612c, while simultaneously applying reaction torques to the end effector 602. The accelerating and decelerating torques will alter the angular velocity, and momentum of the respective reaction masses 612a-612c.

In representative examples the axes 614a-614c are mutually perpendicular but do not necessarily intersect each other. In representative embodiments, as rotational position (or velocity or acceleration) error is detected about one of the axes 614a-614c, the associated VIS module 608a-608c having vibrational control over the axis can be responsive to actuate rotation of its reaction mass about the axis in the same direction as the detected rotational error of the end effector 602 about the axis. The rotational reaction torque from this actuation acts upon the end effector 602 to correct, reduce, or eliminate the rotational error. In some examples, one or more of the VIS modules 608a-608c can be configured with an additional actuator to change an angle of the respective axes 614a-614c to produce a translation of the end effector 602 based on the angle change.

Figure 7:
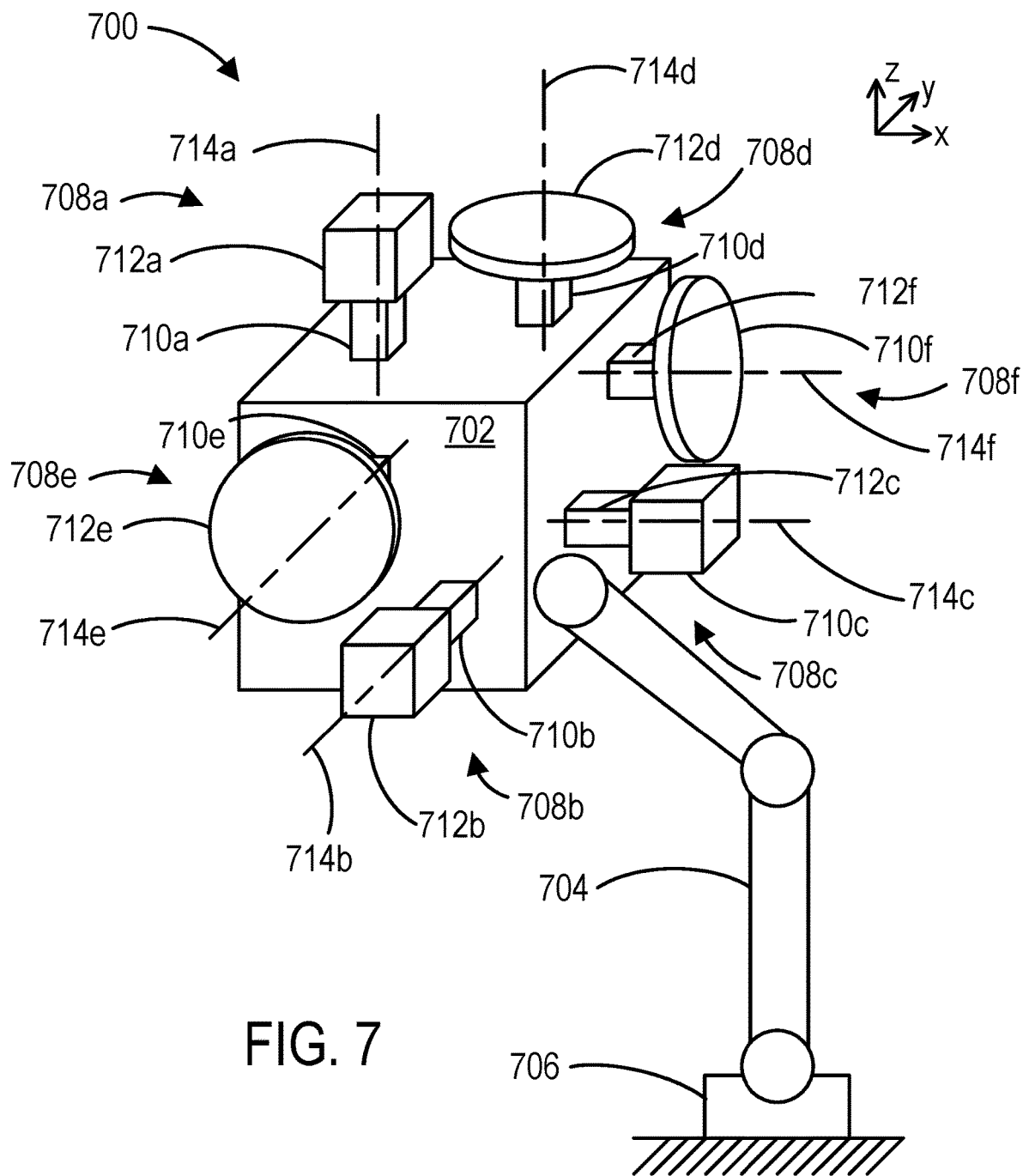

FIG. 7 shows an exemplary robotic system 700 that includes an end effector 702 being held by an articulated robotic arm 704 coupled to a base 706 attached to the ground, which can be similar in some respects to the robotic systems 500, 600. During articulation, the robotic arm 704 moves the end effector 702 to various positions. During the movement to various positions and/or while the end effector 702 is held in a selected position, a plurality of VIS modules 708a, 708b, 708c, 708d, 708e, 708f are coupled to the end effector 702 to reduce vibrational movement of the end effector 702. The VIS modules 708a-708c include respective linear actuators 710a, 710b, 710c coupled to respective reaction masses 712a, 712b, 712c, such as translatable weights, and the VIS modules 708d-708f include respective rotary actuators 710d, 710e, 710f coupled to respective reaction masses 712d, 712e, 712f, such as spinning inertial flywheels. During vibrational control of the end effector 702, the linear actuators 710a-710c translate the reaction masses 712a-712c along respective translational axes 714a, 714b, 714c in response to position errors in the respective directions corresponding to respective translational degrees of freedom of the end effector 702. Also during vibrational control of the end effector 702, the rotary actuators 710d-710f rotate the reaction masses 712d-712f faster or slower about respective rotational axes 714d, 714e, 714f in response to rotational errors in the respective directions corresponding to respective rotational degrees of freedom of the end effector 702. In representative examples the axes 714a-714c are mutually perpendicular but do not necessarily intersect each other and the axes 714d-714f are mutually perpendicular but do not necessarily intersect each other. In some examples, axes 714a, 714d can be parallel, collinear, or oblique with respect to each other, axes 714b, 714e can be parallel, collinear, or oblique with respect to each other, and axes 714c, 714f can be parallel, collinear, or oblique with respect to each other. In representative embodiments, as movement is detected along one of the axes 714a-714c, the associated VIS module 708a-708c having vibrational control over the axis can be responsive to actuate translation of its reaction mass along the axis in the same direction as the detected translational error of the end effector 702 along the axis, and as rotational error is detected about one of the axes 714d-714f, the associated VIS module 708a-708c having vibrational control over the axis can be responsive to actuate rotation of its reaction mass about the axis in the same direction as the detected rotational error of the end effector 702 about the axis. The reaction forces and rotational reaction torques of actuators 710a-710c and actuators 710d-710f will thereby reduce or eliminate the translational and rotational errors of the payload 702, respectively.

Figure 8:
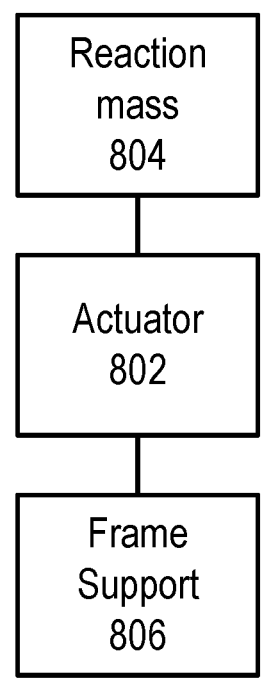
FIG. 8 is a schematic of a VIS module.

FIG. 8 shows a VIS module 800 configured to reduce a movement error or unwanted vibration in a payload or other object. The VIS module 800 includes a reaction mass 804 and an actuator 802 that is coupled to the reaction mass 804. In some examples, the actuator 802 can be a linear actuator configured to translate the reaction mass 804. More specifically, the linear actuator can be configured to translate the reaction mass 804 along a linear direction corresponding to a corrective direction of a movement error of a payload to produce a reaction force. Some examples of linear actuators include voice coil motors, linear motors, pneumatic pistons, hydraulic pistons, or pneumatic bellows, or a combination thereof.

In further examples, the actuator 802 can be a rotary actuator configured to rotate the reaction mass 804. The rotary actuator can be configured to rotate the reaction mass about an axis of rotation to produce a rotational reaction torque along a corrective direction of the movement error of a payload. In some cases, the axis of rotation does not coincide with the center of mass of the reaction mass. In some instances, a brushless servo motor can be used as a rotary actuator. In additional examples, the actuator 802 can provide a combination of translation of a reaction mass and a rotation of a separate reaction mass. In some cases, the actuator can include a support configured to rigidly attach the actuator to a payload such as an end effector or other object. In some examples, the actuator 802 can include a frame support 806 that can be used to support attachment of the VIS module 800 to a payload or object for which reduced movement and/or vibrational stability is desired.

Figure 9:
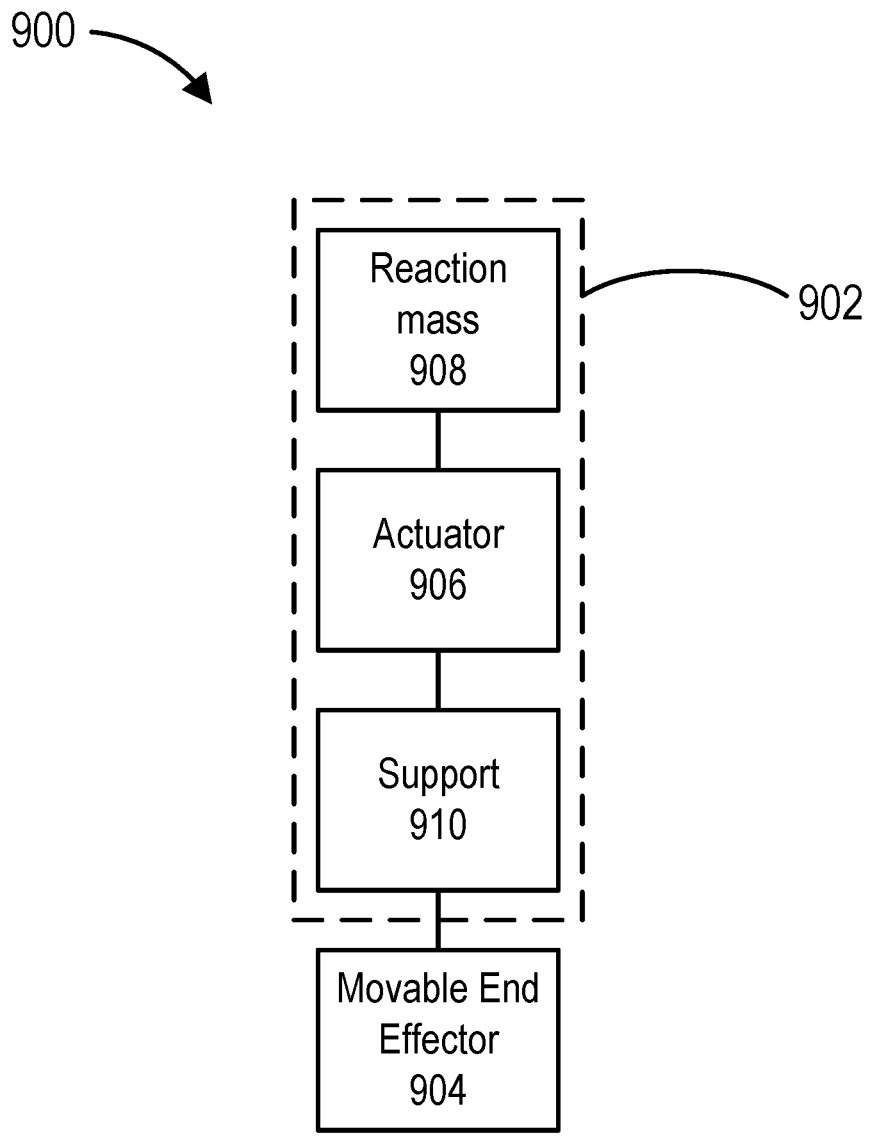
FIG. 9 is a schematic of a VIS module coupled to a movable end effector.

FIG. 9 shows an example of vibrationally stabilizable object 900 that includes a VIS module 902 and a movable end effector 904. The VIS module 902 can include a reaction mass 908 and an actuator 906 that is coupled to the reaction mass 908. In some examples, the VIS module 902 can be attached to the movable end effector 904 with a support 910. In some cases, the actuator can include a support configured to rigidly attach the actuator to a payload such as an end effector.

Figure 10:
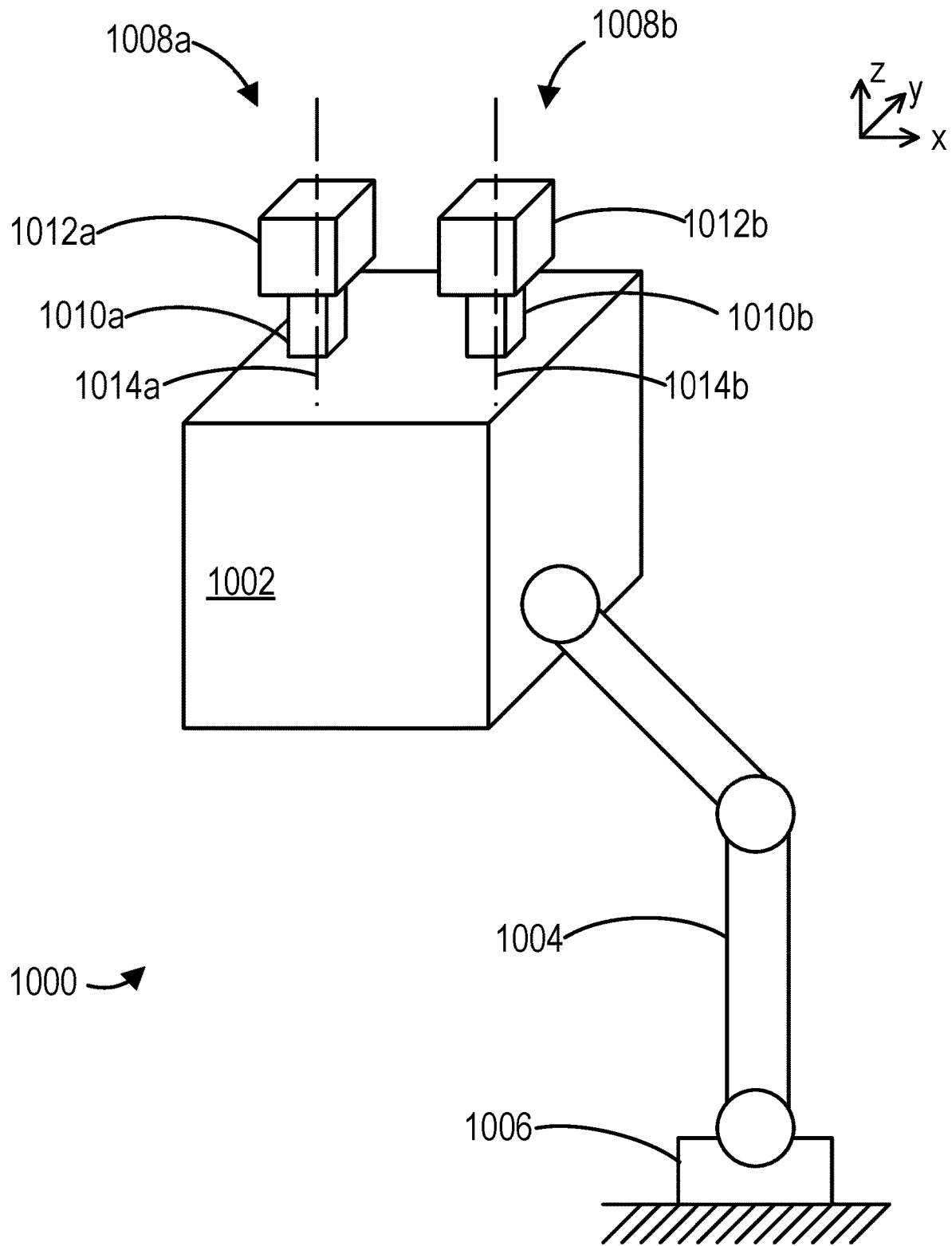
FIGS. 10-11 are perspective schematics of additional robotic systems configured with VIS systems to control various degrees of freedom.

FIG. 10 shows an example of a robotic system 1000 that includes an end effector 1002 being held by an articulated robotic arm 1004 coupled to a base 1006 attached to the ground, which can be similar in some respects to the robotic systems 500, 600, 700. During articulation, the robotic arm 1004 moves the end effector 1002 to various positions. During the movement to various positions and/or while the end effector 1002 is held in a selected position, a pair of VIS modules 1008a, 1008b are coupled to the end effector 1002 to reduce vibrational movement of the end effector 1002. The VIS modules 1008a, 1008b include respective linear actuators 1010a, 1010b coupled to respective reaction masses 1012a, 1012b, such as translatable weights. During vibrational control of the end effector 1002, one or both of the linear actuators 1010a, 1010b can translate the reaction masses 1012a, 1012b along respective translational axes 1014a, 1014b, in response to movement in the respective directions corresponding to respective translational degrees of freedom of the end effector 1002, which can be the same z-direction degree of freedom as shown in FIG. 10. As shown, the translational axes 1014a, 1014b can be parallel to each other and correspond to a common translational degree of freedom. While parallel arrangements may be preferred, non-parallel examples can be provided in some examples.

The VIS modules 1008a, 1008b can also be configured to reduce movement of the end effector 1002 with respect to a rotational degree of freedom. With the axes 1014a, 1014b parallel to the z-direction as shown, and spaced apart from each other along the x-direction, the rotational degree of freedom controllable with non-equal motion of the reaction masses 1012a, 1012b can correspond to rotation about an axis parallel to the y-direction. In representative embodiments, as position error is detected along the z-direction, one or both of the VIS modules 1008a, 1008b can be responsive to actuate translation of the reaction masses 1012a, 1012b along the respective axes 1014a, 1014b to reduce or eliminate the position error of the end effector 1002 along the z-direction. As rotational error is detected about an axis parallel to the y-direction, both of the VIS modules 1008a, 1008b can be responsive to actuate translation of the reaction masses 1012a, 1012b in non-equal amounts, such as by being translated at differing rates and/or in opposite directions, along the respective axes 1014a, 1014b to produce a rotational reaction torque about a y-direction axis that reduces or eliminates the rotational error of the end effector 1002. In examples where a corrective reaction force along the z-direction and corrective rotational reaction torque about the y-direction are applied to reduce z-direction translation and y-axis rotation movement errors, the linear actuators 1010a, 1010b can move in a corrective direction but with different amounts, such as different rates. As with other robotic systems described herein, the VIS modules 1008a, 1008b can be applied to other systems and other objects besides end robotic systems and end effectors. Additional VIS modules for controlling different degrees of freedom, including VIS modules with linear and/or rotary actuators.

Figure 11:
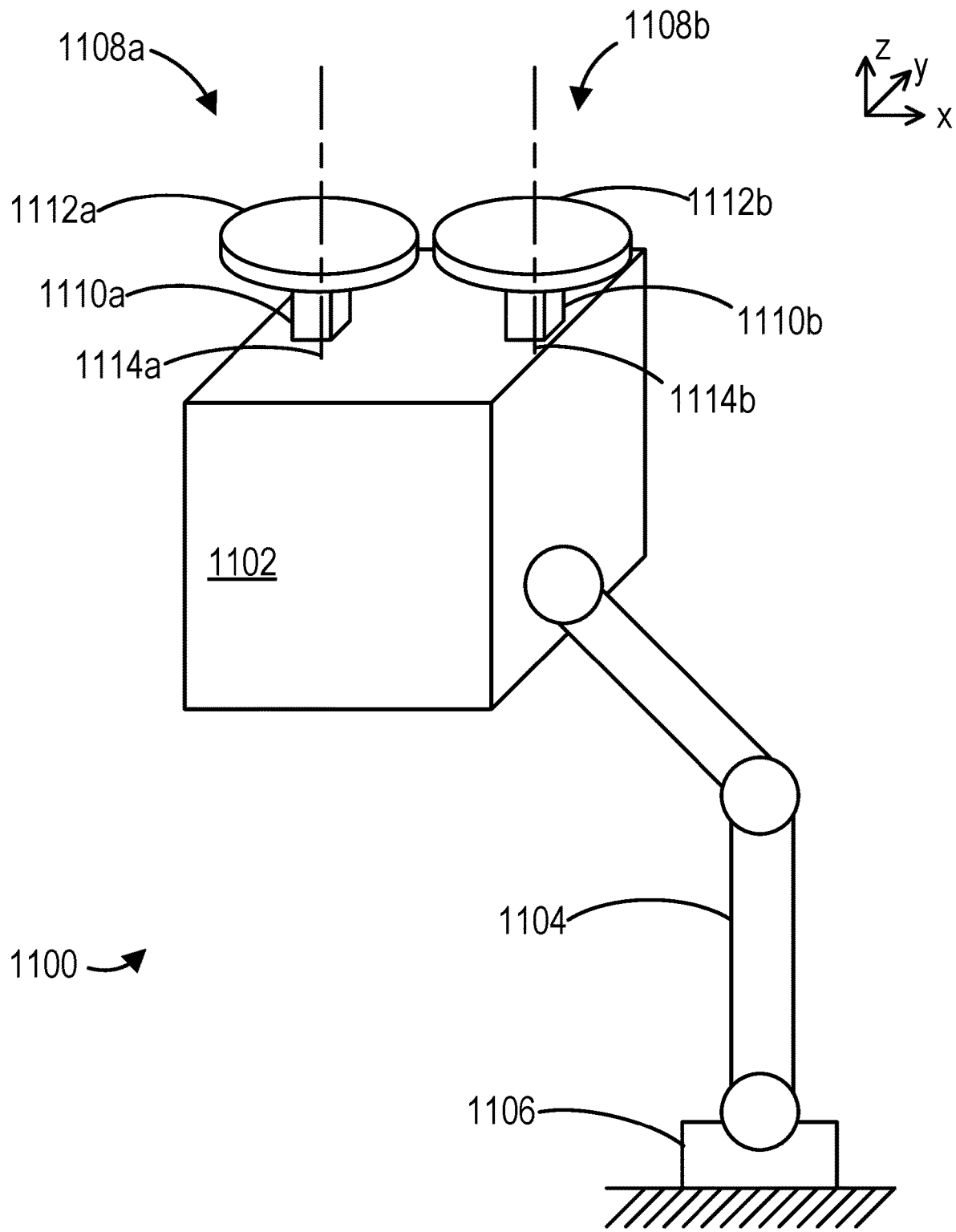

FIG. 11 shows an exemplary robotic system 1100 that includes an end effector 1102 being held by an articulated robotic arm 1104 coupled to a base 1106 attached to the ground, which can be similar in some respects to other robotic systems described herein.

During articulation, the robotic arm 1104 moves the end effector 1102 to various positions. During the movement to various positions and/or while the end effector 1102 is held in a selected position, one or both of a pair of VIS modules 1108a, 1108b are coupled to the end effector 1102 to reduce unwanted vibrational movement of the end effector 1102. The VIS modules 1108a, 1108b include rotary actuators 1110a, 1110b. Each rotary actuator is coupled to a reaction mass. In this case, as shown in FIG. 11, each of rotary actuators 1110a, 1110b is coupled to reaction masses 1112a, 1112b, respectively. In some cases, the system is configured such that the center of mass of each reaction mass does not coincide with the axis of rotation of the rotary actuator to which each reaction mass is coupled. Referring to FIG. 11, in such cases, there is a non-zero distance between a center of mass of each of the reaction masses 1112a, 1112b and the rotational axes 1114a, 1114b of each of the rotary actuators 1110a, 1110b.

During vibrational control of the end effector 1102, one or both of the rotary actuators 1110a, 1110b rotate each of the reaction masses 1112a, 1112b about their respective axes 1114a, 1114b. The reaction masses are rotated in response to movement of the end effector 1102 such that centripetal forces created by the rotation of reaction masses 1112a, 1112b attenuate the movement of the end effector 1102. In the example shown, the rotational axes 1114a, 1114b can be parallel to each other and correspond to a common rotational degree of freedom. Other oblique, collinear, or perpendicular relationships between the rotational axes 1114a, 1114b can be used without limiting the scope of the disclosed techniques.

The VIS modules 1108a, 1108b can also be configured to reduce or control a movement error of the end effector 1102 with respect to a translational degree of freedom. With the axes 1114a, 1114b parallel to the z-direction as shown, and spaced apart from each other along the x-direction, the translational degree of freedom controllable by varying the rotational motion of one of the rotational reaction masses 1112a, 1112b relative to the other corresponds to translational movement along the y-direction. In some examples, one or both of the reaction masses 1112a, 1112b is eccentrically weighted. In these examples, the center of mass of each eccentrically weighted reaction mass does not coincide with the axis of rotation of the rotary actuator to which each reaction mass is coupled. Such a configuration defines a non-zero distance between the center of mass of the reaction masses 1112a, 1112b and the rotational axes 1114a, 1114b of the rotary actuators 1110a, 1110b.

In representative embodiments, in response to end effector 1102 rotational movement detected about an axis parallel to the z-direction, the VIS modules 1108a, 1108b can be responsive to actuate rotation of the reaction masses 1112a, 1112b about the respective axes 1114a, 1114b to produce torques that create a net corrective torque to reduce or eliminate undesired rotational movement of the end effector 1102 about an axis parallel to the z-direction. In response to a translational movement detected along the y-direction, the VIS modules 1108a, 1108b can be responsive to effect a counter-translation of the end effector 1102 by varying the rotation of the reaction masses 1112a, 1112b relative to each other to produce centripetal forces that create a net corrective reaction force in the y-direction. In examples where a corrective rotational reaction torque about an axis parallel to the z-direction and corrective reaction force along the y-direction are applied to reduce rotation about the z-axis rotational degree of freedom and to reduce translation along the y-direction, the rotary actuators 1110a, 1110b can produce individual rotational reaction torques and centripetal forces with different magnitudes. As with other robotic systems described herein, the VIS modules 1108a, 1108b can be applied to other systems and other objects besides end robotic systems and end effectors. Additional VIS modules for controlling different degrees of freedom, including VIS modules with linear and/or rotary actuators.

Figure 12:
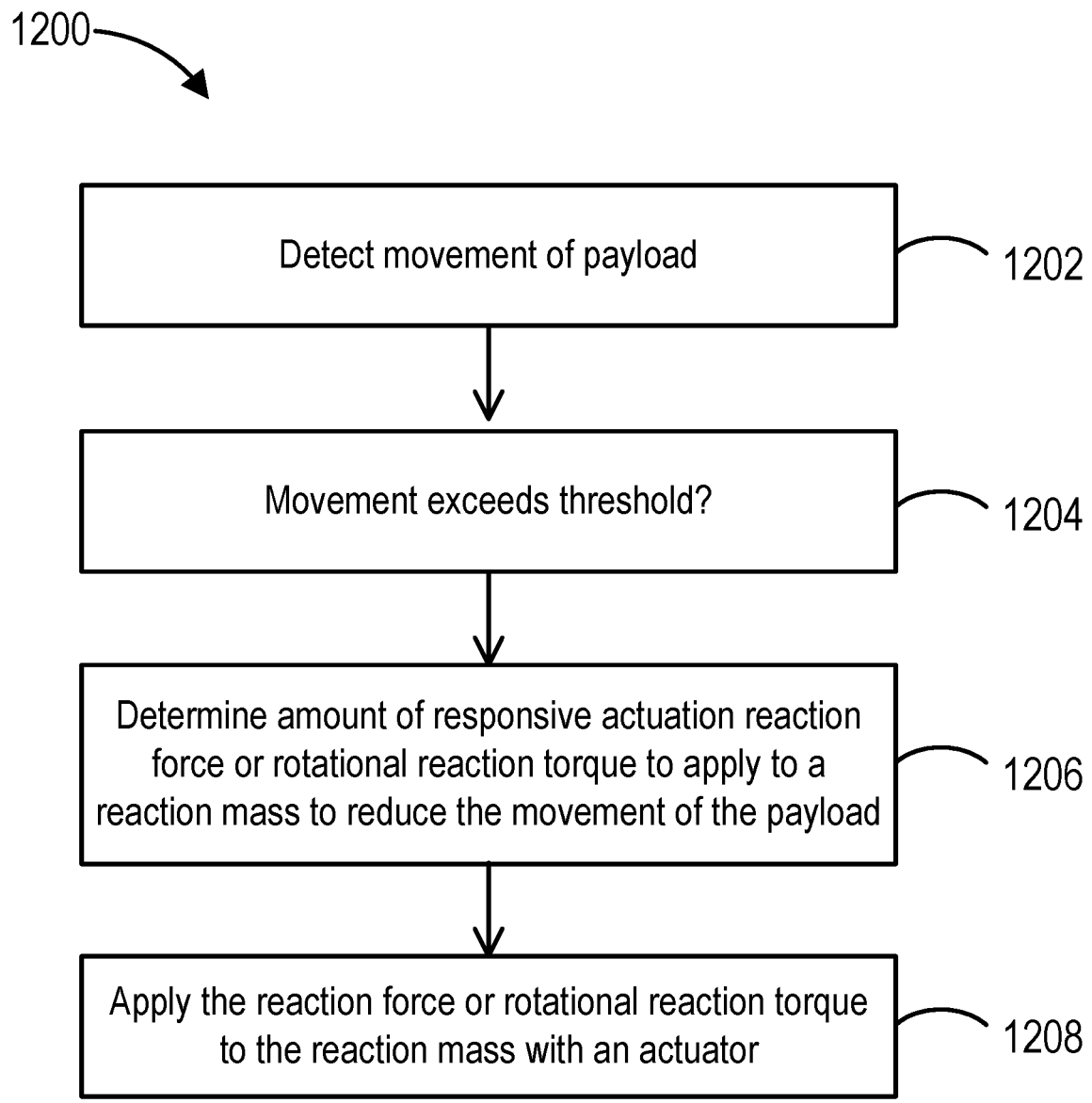
FIGS. 12-17 are flowcharts of exemplary vibrational control and frequency filtering methods.

FIG. 12 shows an exemplary method 1200 of reducing undesired movement of a payload, such as an end effector or robotic arm, in response to a vibration or other undesired disturbance. At 1202, movement of a payload or coupled components is detected. A determination is made at 1204 as to whether the movement exceeds a threshold or other control condition. For movements to be controlled, an amount of responsive actuation reaction force or rotational reaction torque can be determined at 1206 that should be applied to a reaction mass coupled to the payload that would be operable to reduce the movement of the payload. At 1208 the reaction force or rotational reaction torque can be applied to the reaction mass with an actuator to produce the desired movement control. Subsequent detection and control can be provided, e.g., with error feedback, to continue to monitor and reduce the movement and control vibration.

Figure 13:
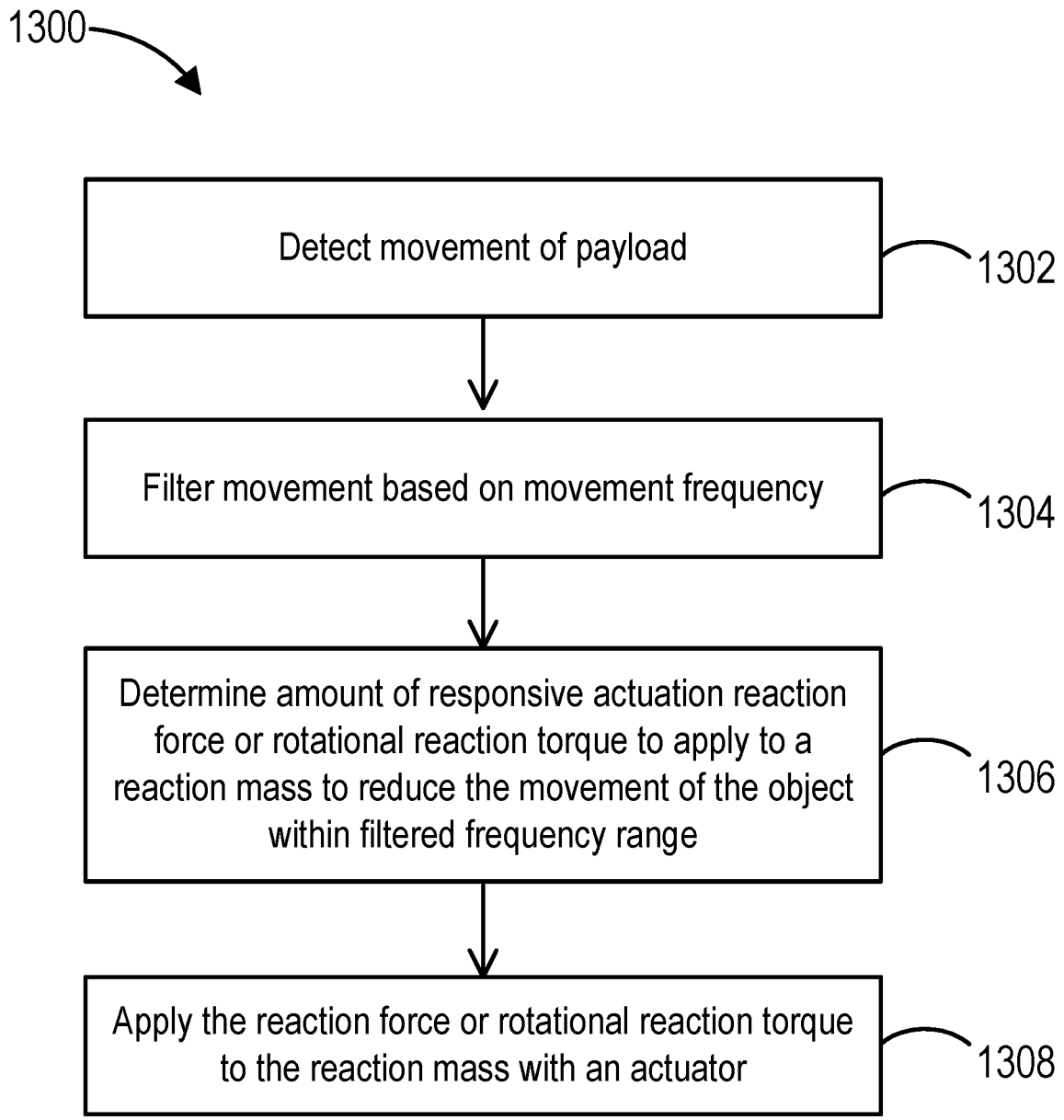

FIG. 13 shows an exemplary method 1300 of reducing vibration based on a frequency filtered detection of movement. At 1302, movement of a payload is detected and at 1304 the detected movement signal is filtered according to filter frequency. At 1306, an amount of responsive actuation reaction force or rotational reaction torque is determined that should be applied to a reaction mass to reduce the movement of the payload within the filtered frequency range. At 1308, the reaction force or rotational reaction torque is applied to the reaction mass with an actuator to reduce the movement.

Figure 14:
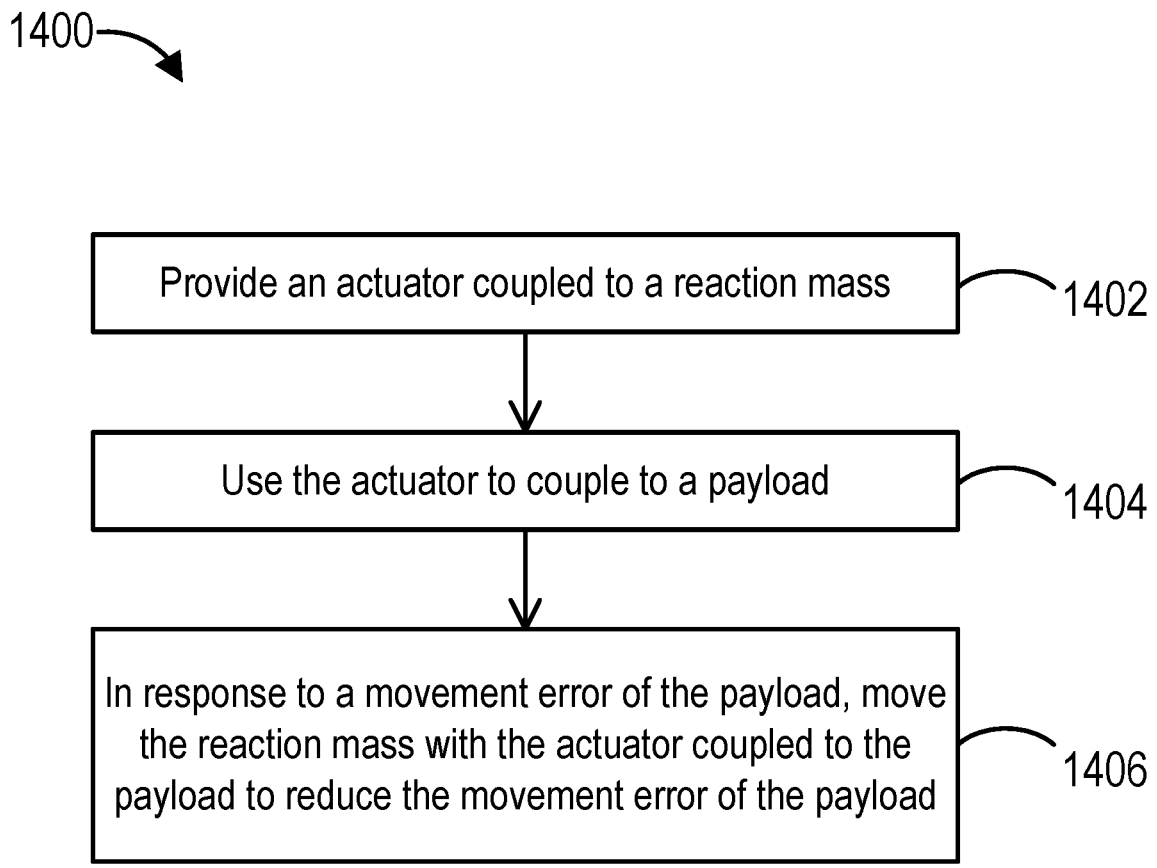

FIG. 14 shows an exemplary method 1400 of reducing a movement error of a payload. At 1402, an actuator coupled to a reaction mass is provided and at 1404 the actuator is used to couple to a payload. At 1406, the reaction mass is moved with the actuator coupled to the payload in response to a movement error of the payload to reduce the movement error of the payload.

Figure 15:
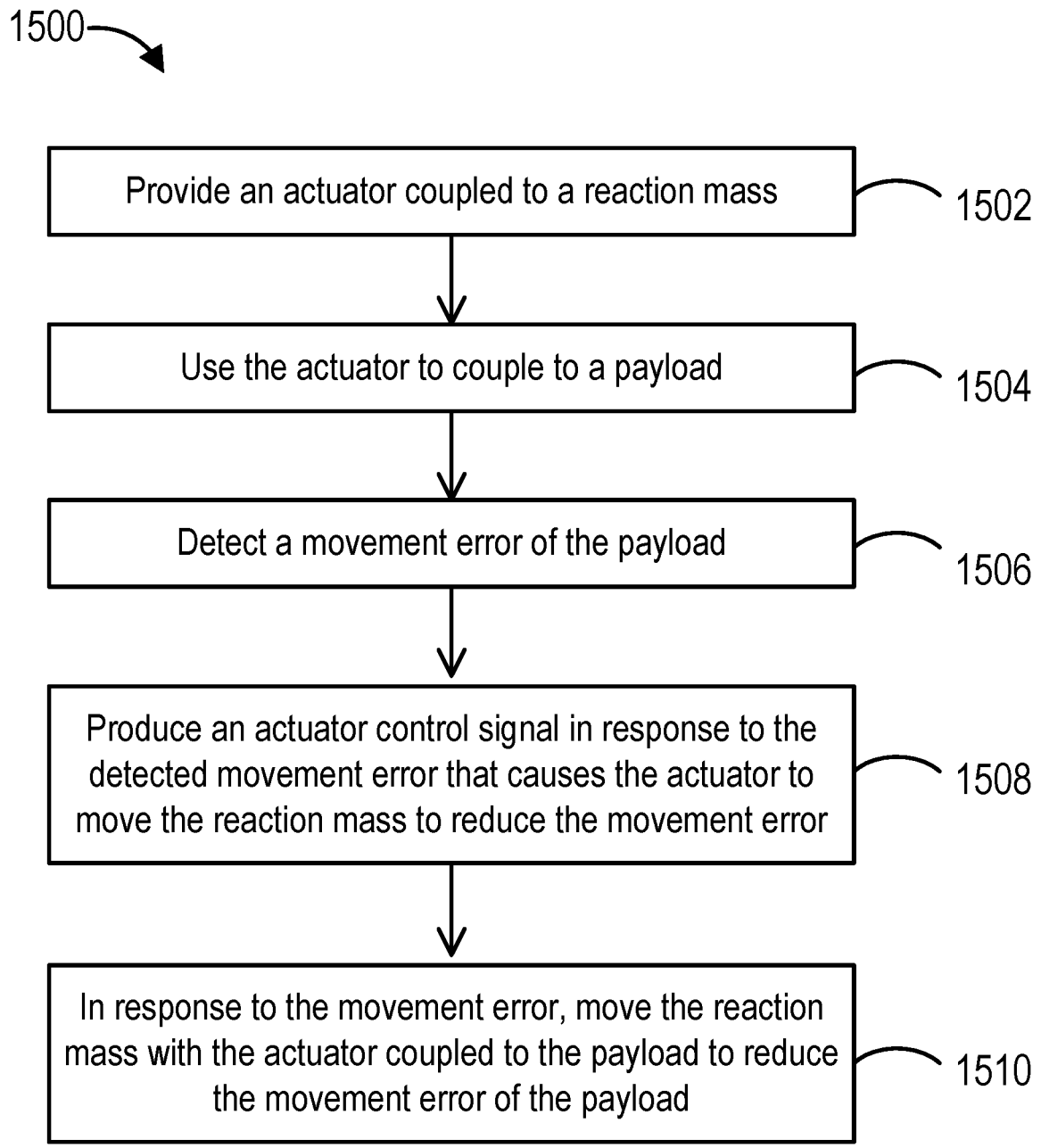

FIG. 15 shows an exemplary method 1500 of reducing a movement error of a payload. At 1502, an actuator coupled to a reaction mass is provided and at 1504 the actuator is used to couple to a payload. At 1506, a movement error of the payload is detected and at 1508 an actuator control signal is produced in response to the detected movement error. For example, as described herein with respect to FIG. 2, a movement detection system can be configured to detect the movement error of the payload, and a controller coupled to the actuator can be configured to produce an actuator control signal in response to the detected movement error. The actuator control signal causes the actuator to move the reaction mass to reduce the movement error and at 1510, the reaction mass is moved with the actuator coupled to the payload in response to a movement error of the payload to reduce the movement error of the payload.

Figure 16:
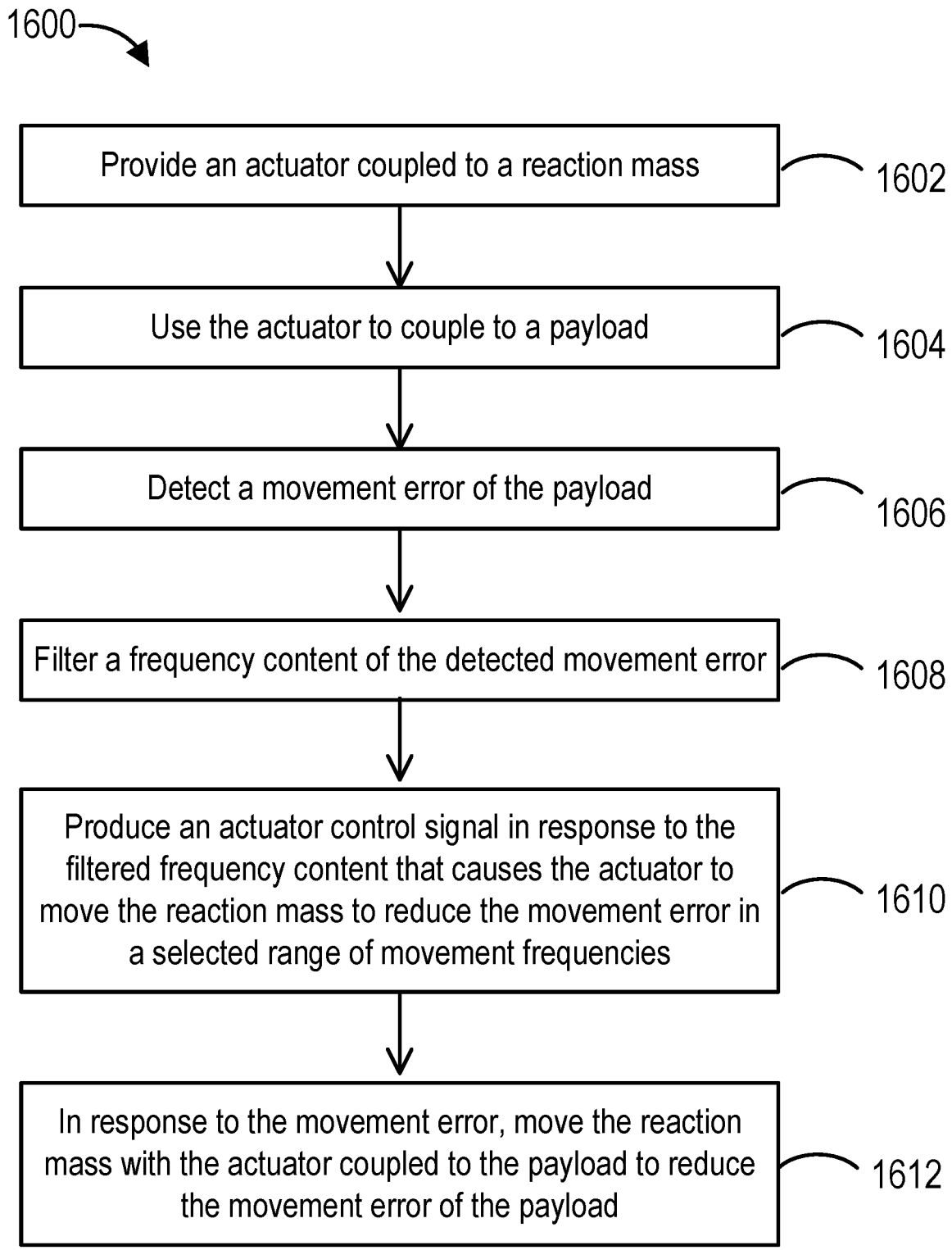

FIG. 16 shows an exemplary method 1600 of reducing a movement error of a payload. At 1602, an actuator coupled to a reaction mass is provided and at 1604 the actuator is used to couple to a payload. At 1606, a movement error of the payload is detected and at 1608 a frequency content of the detected movement error is filtered. For example, as described herein with respect to FIG. 2, a movement detection system can be configured to detect the movement error of the payload, and a frequency filter can be configured to filter one or more ranges of movement frequencies detected by a movement detector. At 1610, an actuator control signal is produced in response to the filtered frequency content that causes the actuator to move the reaction mass to reduce the movement error in a selected range of movement frequencies. In particular, as described with respect to FIGS. 1-3, a controller coupled to the actuator can be configured to produce an actuator control signal in response to the filtered frequency content. The actuator control signal causes the actuator to move the reaction mass to reduce the movement error and at 1612, the reaction mass is moved with the actuator coupled to the payload in response to a movement error of the payload to reduce the movement error of the payload.

Figure 17:
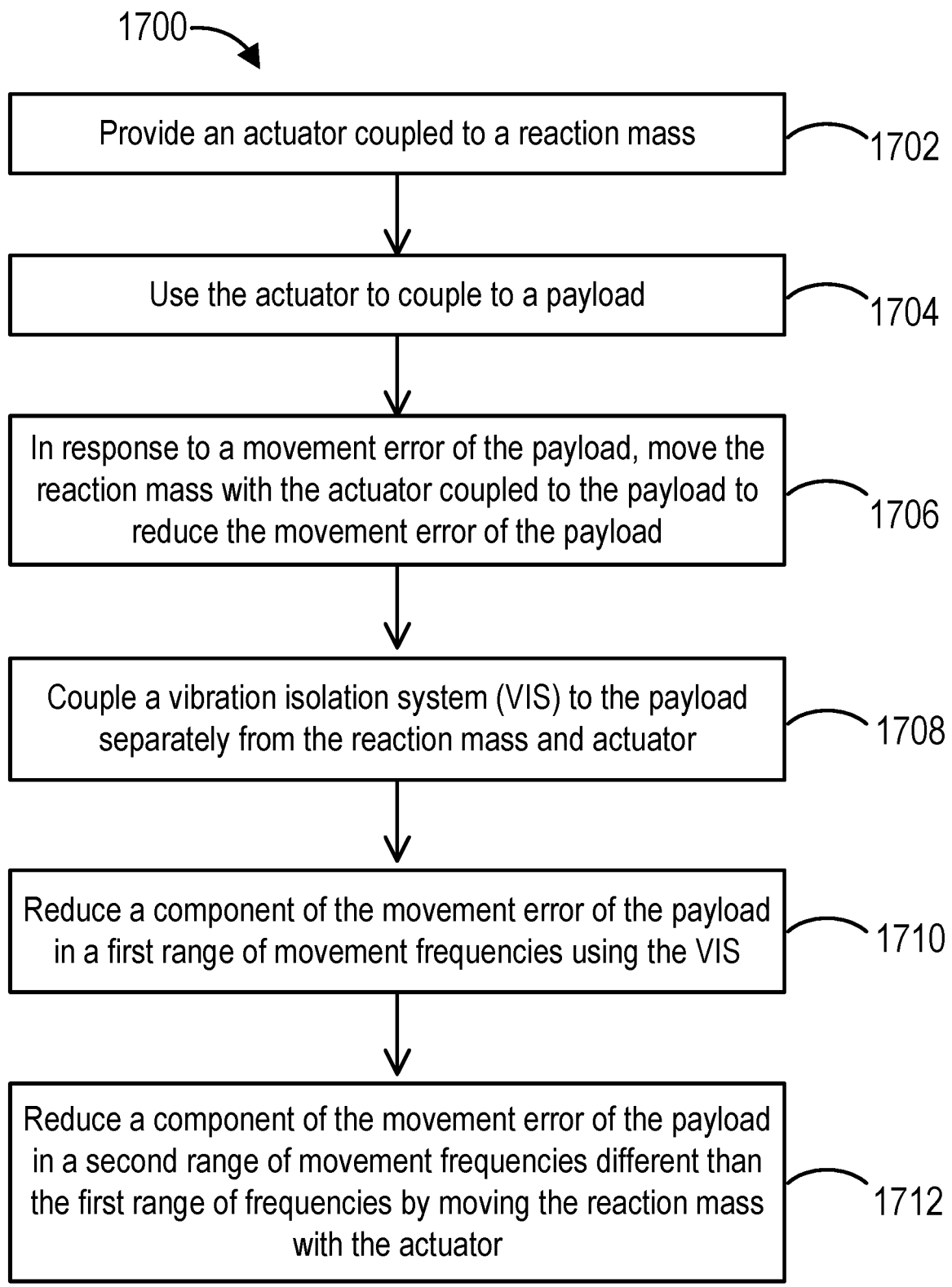

FIG. 17 shows an exemplary method 1700 of reducing a movement error of a payload. At 1702, an actuator coupled to a reaction mass is provided and at 1704 the actuator is used to couple to a payload. At 1706, the reaction mass is moved with the actuator coupled to the payload in response to a movement error of the payload to reduce the movement error of the payload. At 1708, a vibration isolation system (VIS) is coupled to the payload separately from the reaction mass and actuator. At 1710, a component of the movement error of the payload is reduced in a first range of movement frequencies using the VIS. At 1712, a component of the movement error of the payload is reduced in a second range of movement frequencies different than the first range of frequencies by moving the reaction mass with the actuator. For example, as described herein with respect to FIG. 3, a high frequency range signal portion can be used by a reaction mass controller to control actuation of a reaction mass and actuator module coupled to the payload while a low frequency range signal portion can be used by a separate VIS controller to control actuation of vibration isolation components that reduce lower frequency vibrations of the payload.

In some cases as described herein, the reaction mass is moved in a corrective direction of the movement error such that the movement error is reduced. In some cases, the actuator comprises a linear actuator and moving the reaction mass with the actuator comprises translating the reaction mass along a linear direction corresponding to a corrective direction of the movement error to produce a reaction force. In some cases, the actuator comprises a rotary actuator and moving the reaction mass with the actuator comprises rotating the reaction mass about an axis of rotation to produce a rotational reaction torque along a corrective direction of the movement error. Moving the reaction mass with the actuator can comprise tilting the axis of rotation to allow a correction of a different corrective direction of movement error.

In some cases, the detected movement error is detected by a movement detection system, including for example, the movement detection systems and movement detectors described herein with respect to FIGS. 1-3.

In some cases the method further comprises detecting the movement error between the payload and a surface and producing an actuator control signal in response to the detected movement error that causes the actuator to move the reaction mass to reduce the movement error between the payload and the surface. The surface can be a moving reference surface, a non-moving reference surface, and a target surface.

In addition to correcting movement errors related primarily to oscillation or vibration of the payload or other components of the system, the VIS modules described herein can also be configured to reduce movement errors that are fixed position errors of the payload (e.g., steady-state, zero frequency, and/or non-oscillatory position errors relative to a specified position of the payload). For example, the positioning accuracy of robotic systems, such as manipulator arms, can be limited by factors including friction in the actuator(s), friction in the joints between links of the robot, backlash in gears or other force transmission mechanisms, gravity loading, the flexibility or stiffness of robot links, kinematic errors, etc.

Thus, in certain embodiments the VIS modules and systems described herein can be used to apply one or a series of relatively short duration "impulse" forces to a payload by actuation of the reaction mass in a specified direction (e.g., linear and/or rotational). In certain embodiments, the magnitude of the impulse force can be specified in order to overcome friction of the components of the robotic system, resulting in incremental movement of the payload relative to a workpiece or other reference. In certain embodiments, the incremental movement of the payload can be of a specified distance sufficiently small that friction in the robotic system is adequate to maintain the payload at the next incremental position (e.g., taking into account factors including the orientation of the payload, gravity, etc.). Stated differently, the VIS modules can be used to make relatively small, incremental changes in a robotic system's equilibrium point, for example, after it has moved to a specified position or pose. Such position adjustments need not include force(s) applied by the actuators of the robotic system (although the robotic system's actuators can be used to maintain the adjusted position of the payload effected by the VIS modules). This can allow "fine" position adjustment of the payload (or other component of the robotic system) with relatively high resolution. For example, in certain embodiments the VIS modules can be used to correct steady-state position errors that are smaller than the repeatability or specified positioning capability of the robotic system. In certain examples, this can allow for the correction of both oscillatory and steady-state movement errors using the same VIS module system. Exemplary movement increments using linear actuators and reaction masses can be 0 µm to 200 µm, 1 µm to 100 µm, 10 µm to 100 µm, 10 µm to 50 µm, 200 µm or less, 100 µm or less, 50 µm or less, etc. Exemplary rotational movement increments using rotary actuators and reaction masses can be 0 µrad to 200 µrad, 1 µrad to 100 µrad, 10 µrad to 100 µrad, 10 µrad to 50 µrad, 200 µrad or less, 100 µrad or less, 50 µrad or less, etc.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

The invention claimed is:

1. An apparatus, comprising:
    a robot arm;
    a processing unit coupled to the robot arm and movable by the robot arm;
    a reaction mass; and
    an actuator that is coupled to the reaction mass,
    wherein the actuator is configured to couple to the processing unit and to move the reaction mass in response to a movement error of the processing unit to reduce the movement error of the processing unit.

2. The apparatus of claim 1, wherein the actuator is configured to move the reaction mass in a corrective direction of the movement error such that the movement error is reduced.

3. The apparatus of claim 1, wherein the actuator is located between the robot arm and the processing unit.

4. The apparatus of claim 2, wherein:
    the actuator is a linear actuator configured to translate the reaction mass along a linear direction corresponding to the corrective direction of the movement error to produce a reaction force; and
    the linear actuator comprises a voice coil motor, linear motor, pneumatic piston, hydraulic piston, or pneumatic bellows, or a combination thereof.

5. The apparatus of claim 2, wherein the actuator comprises a rotary actuator configured to rotate the reaction mass about an axis of rotation to produce at least one of a rotational reaction torque along the corrective direction of the movement error and a centripetal force.

6. The apparatus of claim 5, further comprising a rotary actuator coupled to the reaction mass and configured to tilt the axis of rotation to allow a correction of a different corrective direction of movement error.

7. The apparatus of claim 2, further comprising:
    a movement detection system configured to detect the movement error of the processing unit; and
    a controller coupled to the actuator and configured to produce an actuator control signal in response to the detected movement error, wherein the movement detection system comprises at least one of an inertial measurement unit and a displacement measurement unit coupled to the processing unit, and
    wherein the actuator control signal is configured to cause the actuator to move the reaction mass to reduce the movement error of the processing unit.

8. The apparatus of claim 7, wherein:
    the movement detection system comprises a displacement measurement unit coupled to the processing unit or to a reference surface and configured to detect the movement error between the processing unit and the reference surface; and
    the displacement measurement unit comprises at least one of: a laser interferometer, time-of-flight system, laser triangulation system, photogrammetric system or a combination thereof.

9. The apparatus of claim 7, wherein the movement detection system is configured to detect a movement error of the processing unit relative to a surface and wherein the actuator control signal is configured to cause the actuator to move the reaction mass to reduce the movement error between the processing unit and the surface.

10. The apparatus of claim 7, wherein the movement detection system further comprises a frequency filter configured to filter low frequency content of the detected movement error and wherein the actuator control signal is configured to cause the actuator to move the reaction mass to reduce the movement error in a selected range of movement frequencies.

11. The apparatus of claim 1, wherein:
    the apparatus further comprises a vibration isolation system (VIS) coupled to the processing unit separately from the reaction mass and actuator; and
    the VIS is configured to reduce movement error of the processing unit in a first range of movement frequencies and the actuator is configured to move the reaction mass to reduce movement error of the processing unit in a second range of movement frequencies different than the first range of movement frequencies.

12. The apparatus of claim 11, wherein:
    the VIS is coupled between the robot arm and an end effector; and
    the VIS is configured to reduce a vibration of the end effector.

13. The apparatus of claim 2, wherein the actuator is a linear actuator configured to translate the reaction mass along a linear direction of a translation axis to produce a reaction force, and wherein the apparatus further comprises:
    a second reaction mass; and
    a second linear actuator coupled to the second reaction mass, the second linear actuator being configured to:
        couple to the processing unit;
        translate the second reaction mass along a second translation axis in response to a movement error of the processing unit about a rotational axis of the processing unit; and
        vary a translation of the second reaction mass along the second translational axis in relation to the translation of the reaction mass to produce a rotational reaction torque that reduces the movement error of the processing unit about the rotational axis.

14. The apparatus of claim 5, further comprising:
    a second reaction mass; and
    a second rotary actuator coupled to the second reaction mass, the second rotary actuator being configured to:
    couple to the processing unit;
    rotate the second reaction mass along a second axis of rotation in response to a movement error of the processing unit about a rotational axis of the processing unit; and
    vary a rotation of the second reaction mass along the second axis of rotation in relation to the rotation of the reaction mass to produce a rotational reaction torque that reduces the movement error of the processing unit about the rotational axis, wherein a center of mass of the reaction mass does not coincide with the axis of rotation and a center of mass of the second reaction mass does not coincide with the second axis of rotation.

15. A method, comprising:
providing an actuator coupled to a reaction mass;
using the actuator to couple to a processing unit that is coupled to and movable by a robot arm; and
in response to a movement error of the processing unit, moving the reaction mass with the actuator coupled to the processing unit to reduce the movement error of the processing unit.

16. The method of claim 15, wherein the actuator comprises a linear actuator and wherein moving the reaction mass with the actuator comprises translating the reaction mass along a linear direction corresponding to a corrective direction of the movement error to produce a reaction force.

17. The method of claim 15, wherein the actuator comprises a rotary actuator and wherein moving the reaction mass with the actuator comprises rotating the reaction mass about an axis of rotation to produce a rotational reaction torque along a corrective direction of the movement error.

18. The method of claim 15, further comprising:
detecting the movement error between the processing unit and a surface; and
producing an actuator control signal in response to the detected movement error that causes the actuator to move the reaction mass to reduce the movement error between the processing unit and the surface.

19. The method of claim 15, further comprising:
filtering a frequency content associated with the movement error; and
producing an actuator control signal in response to the filtered frequency content that causes the actuator to move the reaction mass to reduce the movement error in a selected range of movement frequencies.

20. The method of claim 15, wherein moving the reaction mass further comprises moving the reaction mass with the actuator to correct a steady-state position error of the processing unit.

21. A robotic system, comprising:
a base;
a robot arm coupled to the base;
a processing unit coupled to the robot arm and movable by the robot arm; and
an apparatus comprising a reaction mass and an actuator configured to generate a force,
wherein the reaction mass is movable at least in part by the force generated by the actuator to reduce a positioning error of the processing unit, and
wherein the actuator is coupled to the processing unit.

* * * * *